(12) United States Patent
Lake et al.

(10) Patent No.: US 11,500,358 B2
(45) Date of Patent: *Nov. 15, 2022

(54) SYSTEM AND METHOD FOR MONITORING AND CONTROLLING A MANUFACTURING ENVIRONMENT

(71) Applicant: The Lake Companies, Inc., Green Bay, WI (US)

(72) Inventors: Gregory Paul Lake, Green Bay, WI (US); Kevin Michael Moens, New Franken, WI (US)

(73) Assignee: The Lake Companies, Inc., Green Bay, WI (US)

( * ) Notice: Subject to any disclaimer, the term of this patent is extended or adjusted under 35 U.S.C. 154(b) by 5 days.

This patent is subject to a terminal disclaimer.

(21) Appl. No.: 16/871,395

(22) Filed: May 11, 2020

(65) Prior Publication Data

US 2020/0272135 A1 Aug. 27, 2020

Related U.S. Application Data

(63) Continuation of application No. 15/533,506, filed as application No. PCT/US2016/030958 on May 5, 2016, now Pat. No. 10,698,390.
(Continued)

(51) Int. Cl.
*G05B 19/418* (2006.01)
*H04L 67/125* (2022.01)
(Continued)

(52) U.S. Cl.
CPC ......... *G05B 19/41855* (2013.01); *G01S 5/00* (2013.01); *G05B 19/4185* (2013.01);
(Continued)

(58) Field of Classification Search
CPC ........... H04W 4/80; H04W 4/04; H04W 4/50; H04W 4/029; G05B 19/4185; G06F 3/048; H04L 12/12; H04L 67/12; H04L 67/125

See application file for complete search history.

(56) References Cited

U.S. PATENT DOCUMENTS 6,167,464 A 12/2000 Kretschmann
7,751,829 B2 7/2010 Masuoka et al.
(Continued)

FOREIGN PATENT DOCUMENTS

WO WO 2014/144760 A1 9/2014

OTHER PUBLICATIONS

Indoor Positioning System and Indoor GPS for Apps, [online] Jul. 2015, [Retrieved on Aug. 29, 2017] Retrieved from the Internet:, URL: http://spreo.co/. —pp. 1-4—Jul. 23, 2015—920 Broadway Fl 6, New York, NY 10010—646-827-2769—866-820-2470—info@spreo.co.
(Continued)

*Primary Examiner* — Chris Parry
*Assistant Examiner* — Steven C Nguyen
(74) *Attorney, Agent, or Firm* — Woodard Emhardt Henry Reeves & Wagner LLP

(57) ABSTRACT

A system for monitoring and controlling a manufacturing environment is disclosed. Aspects discussed include beacons broadcasting identifying information for aspects of the manufacturing environment such as workstations, manufactured items, machines, equipment, and people. The identifying information may be used to generate reports about the operation of these and possibly other aspects, as well as provide control options for changing the manufacturing environment. Employees may move about the environment to visually monitor activities taking place, while the system (Continued)

may automatically query for additional information about the tools, equipment, people encountered in the environment. Control options for changing aspects of the manufacturing processes may also be automatically displayed as well.

13 Claims, 10 Drawing Sheets

Related U.S. Application Data

(60) Provisional application No. 62/157,084, filed on May 5, 2015.

(51) Int. Cl.

| | |
|---|---|
| *H04L 67/12* | (2022.01) |
| *G06F 3/048* | (2013.01) |
| *G06Q 50/10* | (2012.01) |
| *G01S 5/00* | (2006.01) |
| *H04W 4/80* | (2018.01) |
| *H04W 4/02* | (2018.01) |
| *H04W 4/029* | (2018.01) |
| *H04M 1/72412* | (2021.01) |
| *H04W 4/50* | (2018.01) |
| *H04L 12/12* | (2006.01) |
| *H04Q 9/02* | (2006.01) |
| *H04W 4/33* | (2018.01) |
| *G01S 11/06* | (2006.01) |

(52) U.S. Cl.
CPC .............. *G06F 3/048* (2013.01); *G06Q 50/10* (2013.01); *H04L 12/12* (2013.01); *H04L 67/12* (2013.01); *H04L 67/125* (2013.01); *H04Q 9/02* (2013.01); *H04W 4/33* (2018.02); *H04W 4/50* (2018.02); *H04W 4/80* (2018.02); *G01S 11/06* (2013.01); *G05B 2219/31162* (2013.01); *G05B 2219/32128* (2013.01); *G05B 2219/34413* (2013.01); *H04M 1/72412* (2021.01); *H04W 4/023* (2013.01); *H04W 4/029* (2018.02)

(56) References Cited

U.S. PATENT DOCUMENTS

| | | | |
|---|---|---|---|
| 8,941,485 | B1 | 1/2015 | Mendelson |
| 9,167,386 | B2 | 10/2015 | Valaee et al. |
| 9,202,245 | B2 | 12/2015 | Kostka et al. |
| 9,229,089 | B2 | 1/2016 | Do et al. |
| 2002/0111702 | A1 | 8/2002 | Angel |
| 2003/0144007 | A1 | 7/2003 | Johansson et al. |
| 2006/0046709 | A1* | 3/2006 | Krumm ................ H04W 64/00 455/422.1 |
| 2006/0095331 | A1 | 5/2006 | O'Malley et al. |
| 2006/0287813 | A1 | 12/2006 | Quigley |
| 2007/0096897 | A1 | 5/2007 | Weiner |
| 2007/0247316 | A1* | 10/2007 | Wildman ........... G08B 21/0263 340/572.4 |
| 2009/0198465 | A1 | 8/2009 | Decker et al. |
| 2009/0216438 | A1 | 8/2009 | Shafer |
| 2009/0304161 | A1 | 12/2009 | Pettyjohn et al. |
| 2013/0059539 | A1 | 3/2013 | Elsom-Cook |
| 2013/0166193 | A1 | 6/2013 | Goldman et al. |
| 2014/0132411 | A1 | 5/2014 | Buchheim et al. |
| 2014/0277615 | A1* | 9/2014 | Nixon ................. G06F 3/04842 700/83 |
| 2014/0280316 | A1 | 9/2014 | Ganick et al. |
| 2015/0109332 | A1 | 4/2015 | Manzoni et al. |
| 2015/0289111 | A1* | 10/2015 | Ozkan ................ H04L 61/6022 455/456.1 |
| 2015/0296347 | A1* | 10/2015 | Roth ..................... H04W 4/021 705/326 |
| 2016/0003626 | A1 | 1/2016 | O'Neill et al. |
| 2016/0302042 | A1* | 10/2016 | Handly ................ H04L 67/306 |

OTHER PUBLICATIONS

Warski, 'How do iBeacons Work?', Jan. 13, 2014, [online] [retrieved on Nov. 27, 2018], Retrieved from the Internet: <URL: http://www.warski.org/blog/2014/01/how-ibeacons-work/>.

Lee et al., 'Enhancement of Industrial Monitoring Systems by Utilizing Context Awareness', Presented Feb. 25-28, 2013, [retrieved on Nov. 27, 2018], from Internet: <URL: https://ieeexplore.ieee.org/document/6523858/authors#authors.

* cited by examiner

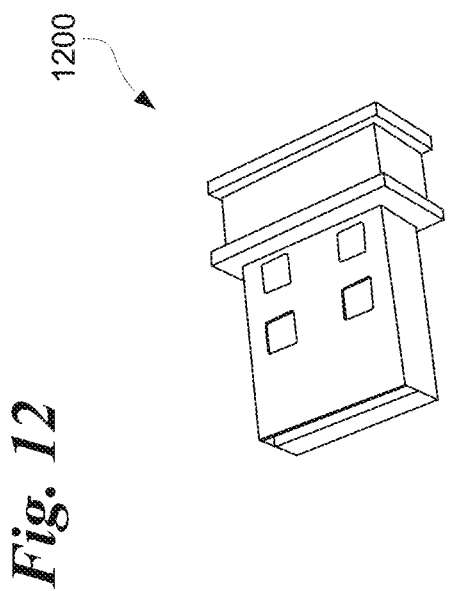
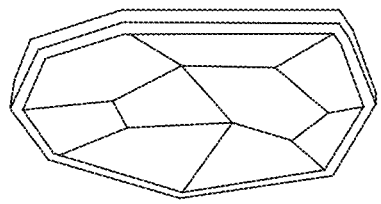
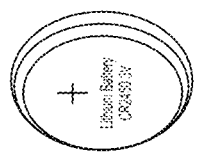
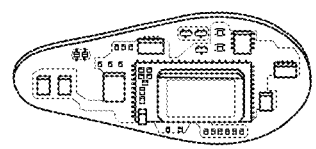
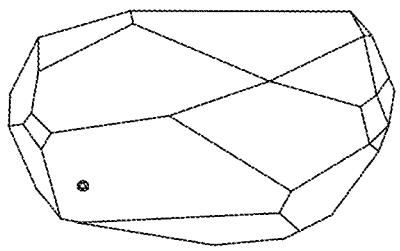
*Fig. 10*
*Fig. 11*
*Fig. 12*

SYSTEM AND METHOD FOR MONITORING AND CONTROLLING A MANUFACTURING ENVIRONMENT

CROSS REFERENCE TO RELATED APPLICATION

This application is a continuation of U.S. patent application Ser. No. 15/533,506 filed Jun. 6, 2017, which is a national stage of PCT/US2016/030958 filed May 5, 2016, which claims the benefit of U.S. Provisional Application No. 62/157,084 filed May 5, 2015, all of which are hereby incorporated by reference.

BACKGROUND

As tablets, smart phones, and other personal computing devices have become smaller and ever more powerful, their ability to interact wirelessly with other devices in the area has expanded significantly. With the early incorporation of Global Position Satellite (GPS), Wi-Fi, and Bluetooth® technology with cellular telephone capabilities, and the more recent addition of Near Field Communication (NFC) and Bluetooth® LE, mobile computing devices now have a growing range of wireless communication options. One aspect of receiving information relates to receiving information based on proximity to other mobile computing devices or proximity to a particular geographical location.

Proximity based computing has found uses in many fields such as in retail where specific advertisements or promotional events may be automatically sent to a smartphone as the user carries the phone near a specific location (e.g. walking past a store front). Proximity technology may also be used to aid a user in moving around a complex environment such as a convention center, museum, shopping mall, theme park, or cruise ship. The use of proximity based computing may mean the user can obtain the necessary information with little or no user input because the device automatically "knows" the information as the user moves around the environment.

A different example of a complex environment is a manufacturing facility. Production lines in such facilities may produce everything from microchips, aircraft, and automobiles, to hand bags, toys, and prepackaged food. Many such facilities cover thousands or millions of square feet, and may employ thousands of workers. Numerous separate work areas or workstations may be present each configured to perform one or more of the many steps that are often required to produce a finished product. The facilities are commonly enclosed in steel or other metals creating significant electromagnetic interference.

Manufacturers continually seek to find more efficient manufacturing processes to reduce costs and increase profits. Organizations often invest considerable money and effort into developing a large and complex corporate knowledge base containing large amounts of information about the efficiency and profitability of the organization's current and past production processes. Additional effort is often spent analyzing the data to determine what changes in the processes need to be made in order to lower costs and increase productivity.

However, maintaining these efficiency targets may require that supervisors have easy access to the corporate knowledge base as they monitor the activities occurring in the production environment. Also, if conditions change on the manufacturing floor, managers may need to make decisions quickly to avoid a wide array of negative outcomes such as additional expense, wasted materials and resources, production down time, unacceptably low quality in the final product, damage to equipment or facilities, or danger to employees. In many situations, making these decisions may be easier if the manager has access to the data, reports, etc. available in the corporate knowledge base. However, in many cases, access to this information may require leaving the production environment, returning to the manager's office (perhaps hundreds or thousands of feet away), obtaining the information, then returning to the location on the production line to analyze the information and make the decision. This may result in an unacceptable delay.

SUMMARY

Disclosed is a system for monitoring and controlling a complex manufacturing environment using beacon technology and proximity-based reporting and control software. The system may use beacons positioned around the production environment that are configured to work with software operating on a computer such as a mobile computing device. As a user carries the mobile computing device around the manufacturing environment, the beacons may broadcast identifying information to the mobile device allowing the software to automatically determine which particular workstations, machines, tools, work products, and/or people are nearby. The software may use this proximity information to automatically access a company knowledge base and generate a user interface with reports, graphs, or charts presenting relevant data. The user interface may also include control options configured to accept input from the user in order to modify the operation of the production environment.

A supervisor or manager using the software may move about the manufacturing environment visually monitoring the activities taking place, while maintaining access to the organization's knowledge base. Supervisors may thus have the ability to quickly obtain relevant information that may be helpful in adjusting the production processes taking place in the environment while remaining in close proximity, able to personally monitor the situation.

The knowledge base may include, for example, data about items being manufactured, personnel, available resources, equipment, machines, workstations, financial aspects, performance aspects, and/or the facility itself. Software modules that may be executed by the personal computing device may be configured to retrieve and/or report on this, or other data, at the user's request. The software modules may include a report module for generating reports, graphs and charts, a workstation module for retrieving information about a workstation such as the people assigned to it, an item module for obtaining data about an item such as its production history and projected completion date, a facility module for retrieving information about the facility such as a floor plan or its production capacity, a communication module for handling communications with beacons and/or other wireless networking devices, a performance module for retrieving information about the performance of the organization, a personnel module for retrieving information about individual people, a resource module for monitoring resource usage, an equipment module for managing production equipment and/or machines, a user interface module for managing the user interface and accepting input from a user, and/or a financial module for retrieving financial data about various aspects of the manufacturing environment.

The user interface module may use data about the facility and the signal strength of nearby beacons to generate a map display showing which beacons are within range of the personal computing device. Some beacon indicators may appear and disappear from the map display as their range from the computing device increases or decreases. Other beacons may be positioned in static locations such as on workstations, walls, fixtures, and the like. These beacons may always appear in the map display in relatively the same location. Beacons may be represented in the map display using any suitable indicia such as various colors, shapes, symbols, icons, and the like.

The personal computing device may receive data from a beacon identifying that particular beacon according to one networking protocol, and access the knowledge base using Wi-Fi or another wireless networking connection that may use a different communication protocol. While often a personal computing device may be portable, in certain arrangements it is may also be a stationary computer, any number of which may be positioned at various locations in the production environment.

Further forms, objects, features, aspects, benefits, advantages, and embodiments of the present disclosure will become apparent from a detailed description and drawings provided herewith.

BRIEF DESCRIPTION OF THE DRAWINGS

FIG. 10 is an exploded view of one example of a beacon transmitter like the transmitters illustrated in the preceding figures.

FIG. 11 illustrates two additional examples of beacon transmitters like the transmitters illustrated in FIGS. 1-5.

FIG. 12 is yet another example of a beacon transmitter like the transmitters illustrated in FIGS. 1-5.

DETAILED DESCRIPTION

Figure 1:
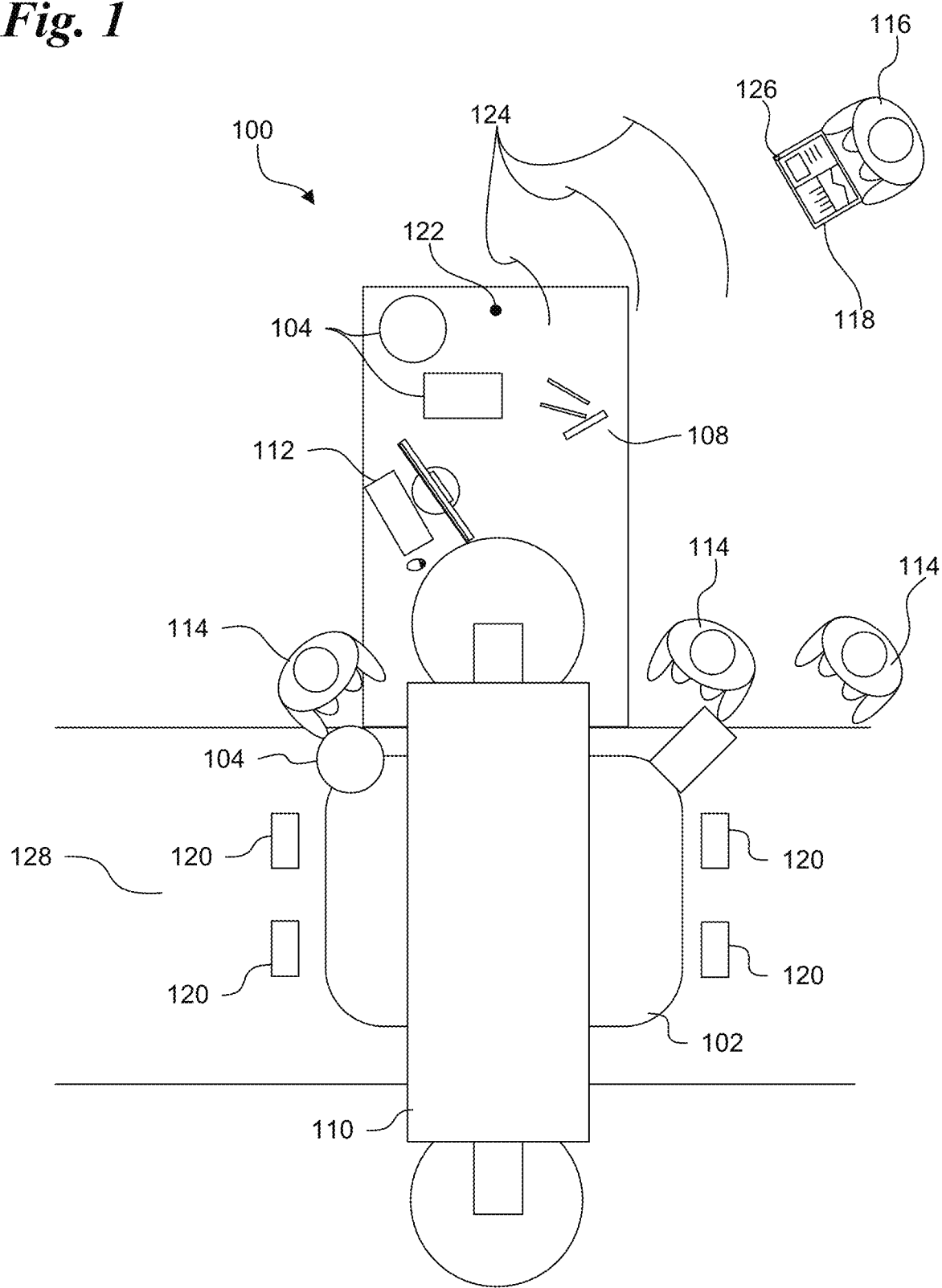
FIG. 1 is a schematic diagram illustrating components of one example of a workstation in a manufacturing environment that includes a beacon for monitoring and controlling the workstation.

Illustrated in FIG. 1 is a schematic example of a workstation or work area at 100 configured to manufacture items 102. Workstation 100 may be integrated into a larger manufacturing environment with multiple other workstations, or workstation 100 may operate as a stand-alone manufacturing environment. An item 102 being produced in the manufacturing process may be at (or "in") workstation 100 positioned so that technicians or workers 114 may continue the process of building item 102. Materials and/or supplies 104 may be applied to item 102 using tools 108 and/or equipment or machines 110 at workstation 100 according to a series of manufacturing steps. A computer 112 may be configured to control machines 110 based on input by technicians 114. A supervisor 116 may also be at or adjacent workstation 100 supervising or monitoring one or more aspects of the manufacturing procedures taking place at workstation 100. Supervisor 116 may be assigned to remain adjacent workstation 100 or assigned to move around the production environment periodically visiting workstation 100. Multiple supervisors 116 may be in the production environment assigned to specific workstations or moving around to monitor the environment as a whole.

In one example, workstation 100 may be the only station where all activities performed in the manufacturing, testing, and packaging of items 102 occur. In another example, item 102 is at workstation 100 and may have arrived at workstation 100 in an incomplete or partially completed form. One example of such a workstation 100 is a workstation that is included as part of an arrangement of multiple workstations 100 such as in an assembly line. Item 102 may be produced or assembled in stages and may arrive at workstation 100 so that additional components or subassemblies may be added. Materials, processes, equipment, and/or labor or other resources may be employed to make changes to item 102 before it is passed to a subsequent workstation. Sensors 120 positioned in the work area may be positioned to indicate when item 102 enters or exits workstation work area 128, or to detect and report other characteristics. Any suitable sensor 120 may be used such as pressure sensors, light curtain sensor arrays, and mechanical switches to name a few.

In another example, workstation 100 may also be a first, or originating station in a series of stations. Item 102 may be originally generated, constructed, formed, or otherwise brought into existence from raw materials. Examples of raw materials include ceramics, fossil fuels, base chemical elements, polymeric beads and the like. For example, workstation 100 may originate item 102 in a foundry or injection molding machines included in the workstation. The item may be created initially by transforming metallic substances or polymeric beads into complex three-dimensional shapes under suitable heat and pressure inside a mold. Item 102 may then be passed along to subsequent workstations for further manufacturing steps or processes.

Supervisor 116 may be equipped with a monitoring computer 118 which may be a personal computing device such as a tablet computer, smartphone, or laptop computer. Computer 118 may include a receiver 126 that is manufactured as part of the computer, or coupled to computer 118 as a separate unit configured to be removable from computer 118. An example of a commercially available separate receiver is illustrated at 1200 in FIG. 12. Receiver 126 may be configured to respond to one or more frequencies of electromagnetic radiation 124 broadcasting from a workstation beacon 122. Examples of commercially available beacons that may be used are illustrated at 1000 in FIG. 10, and at 1100 and 1104 in FIG. 11. Electromagnetic radiation 124 may extend away from beacon 122 in all directions in three-dimensional space where it may be detected by a receiver 126 positioned above or below beacon 122. In another example, electromagnetic radiation 124 may be broadcasted using an antenna or antenna system that is configured to focus or direct electromagnetic radiation 124 in one direction more than in another direction that may be opposite the first direction.

Figure 2:
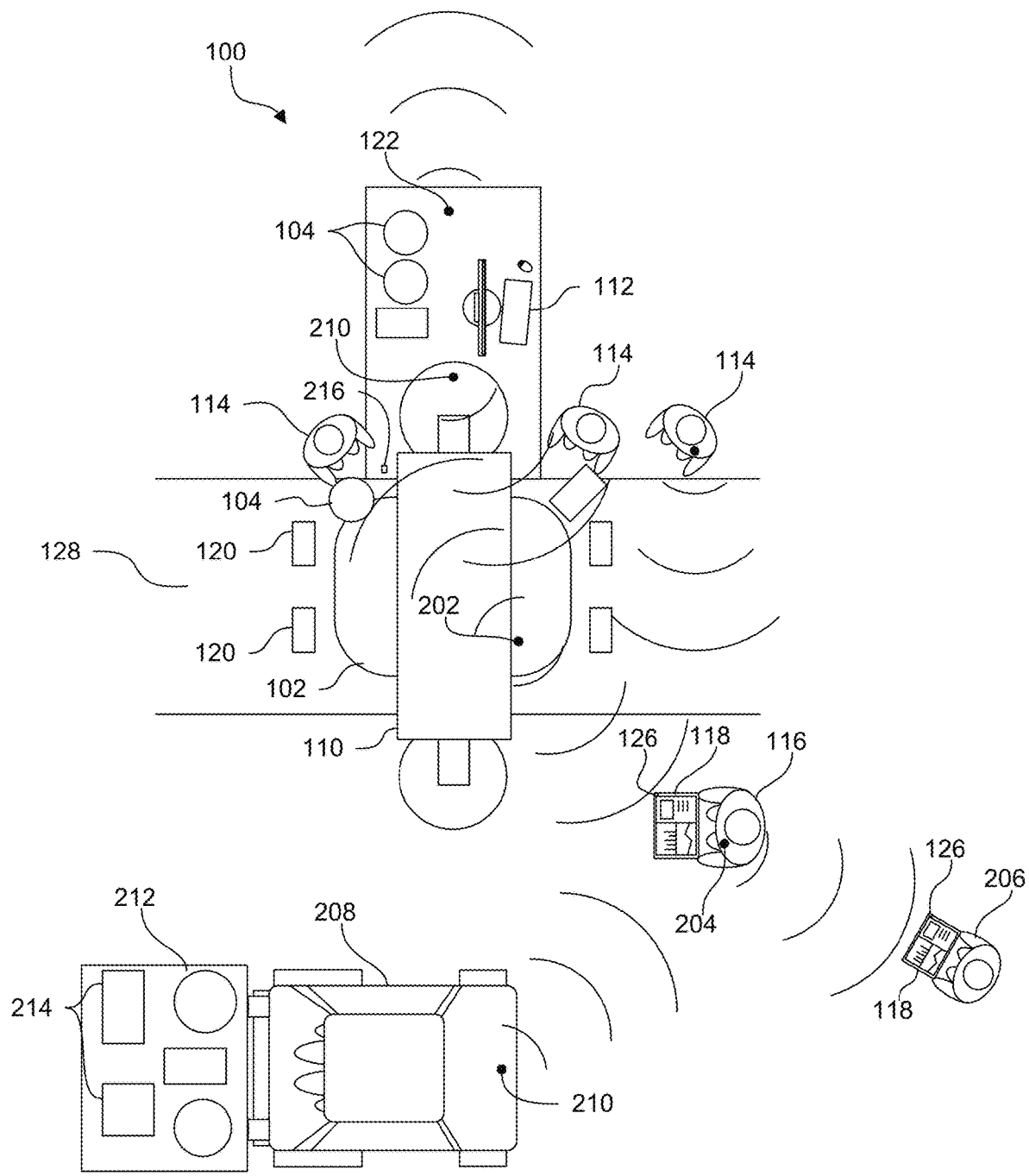
FIG. 2 is a schematic diagram illustrating components of another example of a workstation like the workstation in FIG. 1 having multiple beacons.

FIG. 2 illustrates at 200 another example of a workstation showing other people, equipment, or machines that may be present at workstation 100 during the manufacturing process. For example, equipment 208 may arrive at workstation 100 periodically or as needed bringing resources 214 via a materials container 212 such as a pallet or bin. Resources 214 may include raw materials, sub-assemblies, tools, equipment, and the like used at workstation 100. Equipment 208 may be operated by a person or controlled by a computer configured to operate equipment 208 to deliver resources 214. A supervisor 116 with a computer 118 and receiver 126 may be present to monitor and direct activities at workstation 100. A manager 206 with a second computer 118 also having a receiver 126 may be present to monitor supervisor 116 and direct activities at workstation 100 as well.

As illustrated in FIG. 2, beacons like beacon 122 may be positioned elsewhere in the work environment other than at a workstation 100. A work piece beacon 202 may operate like beacon 122 and may be coupled to item 102. Beacon 202 may be temporarily coupled to item 102 and later removed, or beacon 202 may be manufactured as part of item 102 and deactivated later or allowed to continue transmitting after completion and delivery. Beacon 202 may be configured to broadcast a unique beacon ID which may be represented as a single field with a unique ID, or multiple fields that together define a unique ID for a given beacon 202. For example, all beacons 202 may transmit a UUID common to a particular organization, a major field identifier common to a specific facility, factory, work center in a factory and the like, and a minor field identifier unique to each item 102. For example, the minor field identifier may include a serial number or other unique identifier for an item 102. The combination of UUID, major field, and minor field may be useful as a composite key identifying an individual beacon coupled to a specific item 102.

A personal beacon 204 may operate like beacon 122 and/or 202 and may be coupled to a person such as a technician or worker 114, supervisor 116, a manager 206, or any other member of an organization. Beacon 204 may, for example, be included with an employee's organizational credentials. An employee access card, for example, may be worn by a person 114, 116, or 206 or other person and may include beacon 204 thus allowing beacon 204 to always be present when the person has their organizational credentials.

Beacon 204 may be configured to broadcast a unique beacon ID which may be represented as a single field with a unique ID, or multiple fields that together define a unique ID for a given beacon 204. For example, the minor field identifier may include an employee ID number or other unique identifier for a person that is part of a particular organization. The combination of UUID, major field, and minor field may be useful as a composite key or unique beacon ID identifying a specific beacon coupled to a specific person 114, 116, or 206.

In another example, an equipment beacon 210 may operate like beacons 122, 202, and/or 204 and may be coupled to a machine 110 or piece of equipment such as equipment 208. Examples include stationary devices such as manufacturing robots, foundries, presses, stamping machines, milling machines, welders, conveyers, water jets, lifts, automated inventory retrieval systems, and the like; or mobile equipment or machines such as lift trucks, pallet jacks, robots, bulldozers, excavators, tractors, loaders, cranes, boats, barges, or aircraft including remotely or automatically piloted aerial drones.

Beacon 210 may be configured to broadcast a unique beacon ID which may be represented as a single field with a unique ID, or multiple fields that together define a unique ID for a given beacon 210. For example, all beacons 210 may transmit a UUID common to an organization, a major field identifier common to a specific facility or organizational unit within a facility, and a minor field identifier unique to a specific machine or piece of equipment. For example, the minor field identifier may include a machine ID number or other unique identifier for a machine assigned to a particular role or organization. The combination of UUID, major field, and minor field may be useful as a composite key or unique beacon ID identifying a specific beacon coupled to a specific machine 110 or equipment 208.

With beacons like beacons 122, 202, 204, and 210 in the a work environment, supervisors or managers 116,206 respectively, may be able receive data about the operations of the various workstations, machines, equipment, and the like, as well as track the progress of items produced and individuals involved in the manufacturing process. A manager may move from one place to another in the manufacturing environment positioning receiver 126 within range of any of the afore mentioned beacons. For example, as illustrated in FIGS. 1 and 2, a manager 116 operating a monitoring computer 118 may move within range of signals from an adjacent beacon 122 as the manager visits a workstation 100. A manager 116 may similarly move receiver 126 adjacent a specific item 102, or adjacent a machine 110 or equipment 208 which may be stationary, temporarily stopped, or passing by.

A manager may thus be able to visually perceive the manufacturing activities taking place while computer 118 may automatically update with relevant data without user input. Data received from beacons in the work environment may be used by software executed by computer 118 to automatically query for and retrieve detailed data and/or reports from a corporate knowledge base providing detailed information about the activities taking place, and optionally offering controls that allow the manager to modify the behavior of the equipment, machines, and people involved in the manufacturing process. Other individuals, who may or may not be present in the work environment, my then retrieve this information from the knowledge base. In one example, the system may automatically track whether supervisors, managers, or other employees move past one or more specified locations with a given period of time (e.g. check in at a particular workstation or at least once every two hours, once a week, once a month, and the like).

With this and other information stored in the knowledge base, the system may provide reports on whether a specific employee, group of employees, or individual filling a role was present as required, and for how long. In another example, the system may be configured to display a timeline, animation, list of log entries, or other useful visual or textual report indicating the path taken by an employee, manager, and/or supervisor over a predetermined period of time. An person's action may then be "replayed" based upon locations visited. Such replay reports may be for actions taken in a single day, in a week, in a month, or for any other suitable period of time.

Workstation 100 may include a receiver 216. Receiver 216 may be coupled to computer 112 and configured to respond to broadcast from any of beacons 202, 204, 210, and others. For example, receiver 216 may be configured to register the presence of items 102 as they move through the work area. One way this may be accomplished is for receiver 216 to receive identifying data from a broadcasting beacon 202 identifying a specific item 102. This identifying data may be received as item 102 approaches workstation 101. When item 102 is positioned between sensors 120, computer 112 may be programmed to send a notification or update a record in a knowledge base indicating that an item 102 has arrived at workstation 100. A separate notification or update may be logged when item 102 passes beyond sensors 120 and receiver 216 is out of range of beacon 202.

Figure 3:
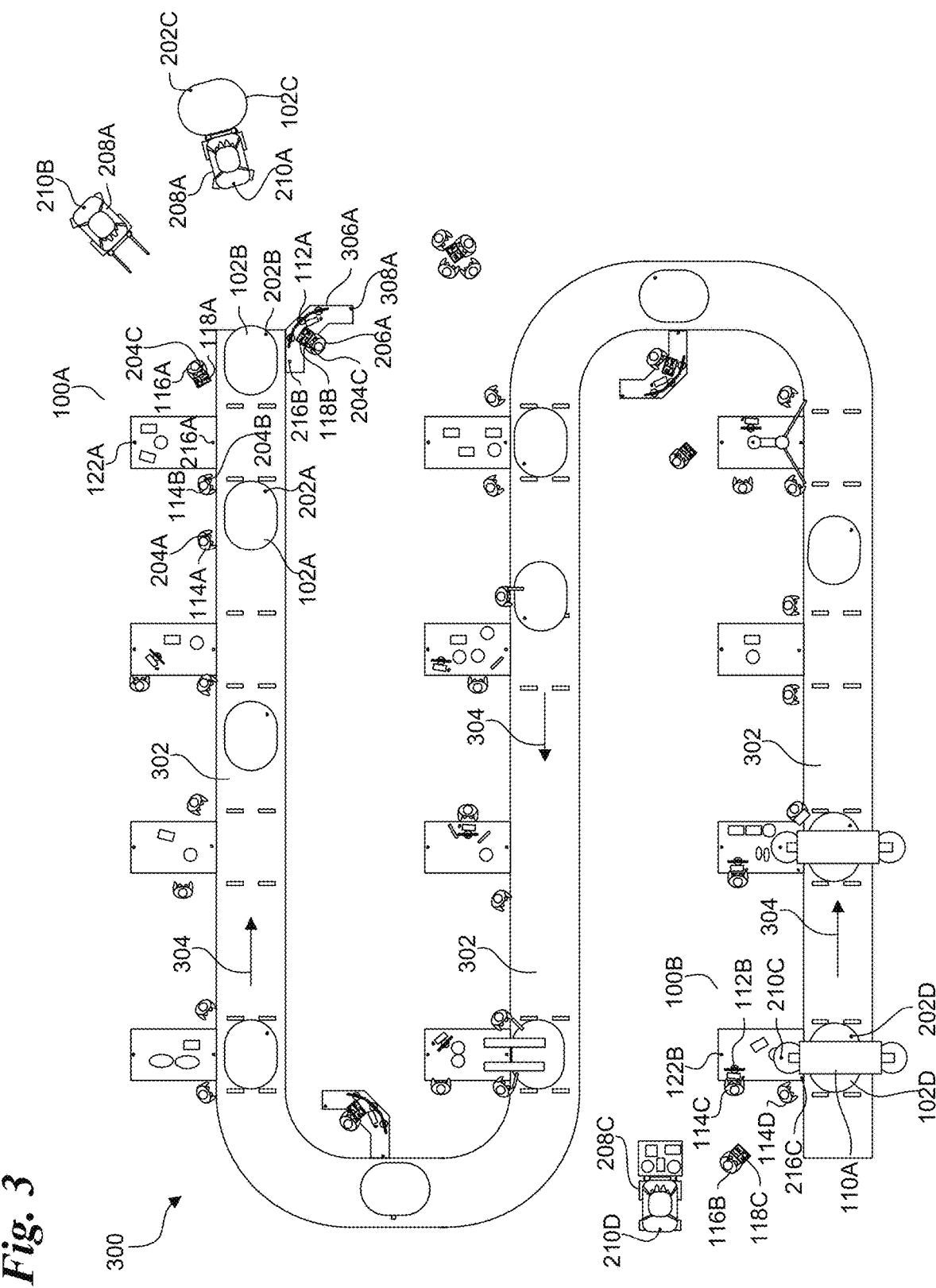
FIG. 3 is a schematic diagram illustrating components of one example of a manufacturing environment that includes workstations like those of FIG. 1 and FIG. 2.

Additional detail of such an environment is illustrated in FIG. 3 showing examples of beacons positioned around a manufacturing environment 300. Beacons 122, 202, 204, and 210 are illustrated in FIG. 3 as "dots" positioned in association with multiple production assets such as at workstations, on (or in) items 102 being manufactured, on people, and on (or in) equipment or machines. Manufactured items pass along a path 302 in the direction of arrows 304 as they move from one workstation to another. Path 302 may include a single conveyer system for moving the items at a predetermined rate from one station to the next. Path 302 may also include a conveyer system where separate conveyers move items from one station to the next, leaving when technicians move the item out of the first station onto a conveyer heading toward the second. In another example, path 302 may be an open area without conveyers delimited to show where items on rollers, casters, dollies, pallet jacks, and the like are allowed to freely move as they are moved from one workstation to another. Any suitable system for moving items through the various workstations 102 in the manufacturing environment may be used.

FIG. 3 is one conceptual example of a manufacturing environment should be considered illustrative rather than restrictive as any suitable arrangement of workstations, work areas, machines, technicians, supervisors, equipment, etc. is envisioned.

For example, a supervisor 116A is illustrated adjacent a final portion of path 302 adjacent workstation 100A near where items 102A, 102B, and 102C are located. Equipment 208A and 208B operate to remove items 102 from path 302 for inventory. Technicians 114A and 114B may be positioned at workstation 100A and may be carrying personal beacons 204A and 204B respectively (E.g., beacons 204A and 204B may be embedded in their employee ID badges issued by the organization). A supervisor 116A may move past various stations and as a result may carry a personal beacon 204C and a monitoring computer 118A. A manager 206A may be positioned at a manager's workstation 306A with a monitoring computer 118B and carrying a personal beacon 204D. A manager's workstation beacon 308A may also be present. Workstation 100 may include a workstation receiver 216B, and managers workstation 306 a may include a workstation receiver 216B. Workstation receivers 216 may be used to receive data from beacons thus passing by allowing the system to track the movements of specific people, items, and/or equipment into and out of an area adjacent to workstation 100A or managers workstation 306.

Supervisor 116A may be in range of beacons 102A, 102B, 102C, 204A, 204B, 204C (the manager's own beacon), 204D, 122A, 208A, 208B, and 308A. Other beacons in the manufacturing environment may be out of range depending on their output power signal attenuation and other factors. For example, some of the aforementioned beacons may be out of range of a receiver in supervisor 116A's monitoring computer 118A. A supervisor arriving at workstation 100A may therefore be able to receive data from a number of beacons, some moving, some stationary.

Supervisor 116A may be able to use software in computer 118A that is configured to receive the transmitted data and use it to access a wide range of additional detailed data and/or generate reports showing any information in the organization's knowledge base regarding technicians 114A and 114B, workstation 100A, equipment 208A and 208B, employees 116A and 206A, and items 102A, 102B, and 102C. Such data may include data about the work habits and productivity of technicians 114A and 114B currently assigned to workstation 100A, employees previously stationed at workstation 100A and their productivity, employees scheduled to work at workstation 100A in future shifts, the resources used by employees at workstation 100A and how those usage rates compare to other workstations or other employees on other shifts. The software may be configured to allow access to the maintenance history of tools or machines at workstation 100A, and/or change the operating parameters of machines at workstation 100A or adjust the work assignments of technicians assigned to workstation 100A in current or future shifts.

Software in computer 118A may be configured to use data transmitted from item beacons 202A, 202B, and 202C to retrieve data and/or generate reports regarding items 102 arriving, currently being worked on, and leaving workstation 100A. Such reports may include a list of parts or subassemblies added to the items at workstation 100A or at other workstations, a history of manufacturing exceptions, mistakes, and/or repairs, occurring at workstation 100A or other workstations the items 102A-C passed through, or any other relevant information useful for determining what changes to make in the manufacturing process, if any.

Data made available via beacons 202A-C (or any of the other beacons discussed herein) may also serve for quality control purposes and/or product safety audit. For example, the software may determine what parts were included in items 102A-C using the unique IDs sent by beacons 202A-C. The software may then automatically search for and report parts in items 102 that may have been found to be detective, outside manufacturing specifications, or otherwise unfit for delivery. The software may be configured to automatically update the knowledge base when safety or quality issues are detected. Alerts records may also be automatically generated and other actions may be taken up to and including quarantining items, shutting down the production line, executing the building and the like.

The software in computer 118A may also be configured to receive transmitted data from beacons 212A and 212B and use it to access data and reports related to equipment 208A or 208B. Such information may include the maintenance history, the time-on-task, operating costs, repair history, blueprints, schematics, or operator's manuals. The software may be configured to accept input from supervisor 116A taking, for example, equipment 208A out of service and requesting a repair or routine maintenance be performed, and/or requesting another piece of equipment 208 be sent.

The software operating on computer 118A or on another computer such as computer 112A may allow manager 206A at manager's workstation 306A to perform similar monitoring of items 102, workstation 100A, equipment 208A and the like, while also monitoring and obtaining information about supervisor 116A based on the unique ID information broadcast by beacon 204C. Manager 206A may be able to determine how frequently supervisor 116A visits workstation 100A or other workstations, the types of reports accessed by supervisor 116A, and the changes to the production process requested by supervisor 116A. The software may allow manager 206A to approve or deny requests for such changes, as well as requests for new equipment, machines, or resources, and the like.

In another example, workstation 100B at the start of the illustrated production process may include a beacon 122B, a computer 112B, and a machine 110A. Machine 110A may be operated or controlled by technicians 114C and 114D at workstation 100B and may include equipment or machine beacons 210C. Workstation 100B may also include a workstation receiver 216B useful for detecting the presence of beacons associated with people, items, or equipment as they pass into and out of an area adjacent workstation 100B. The software in computer 118C may be configured to receive transmitted data from any nearby beacon such as workstation beacon 122B and/or equipment beacons 210C mounted on a machine 110A, and 210D mounted on equipment 208C. As discussed above, the transmitted data may be used to access any available information and/or generate reports using identifying date sent by the beacons.

For example, keys or IDs transmitted by beacons 210C or 210D may be used to access records about the accompanying machines or equipment. Such information may include the maintenance history, the time-on-task, operating costs, repair history, blueprints, schematics, or operator's manuals. The software may be configured to accept input from supervisor 116B taking, for example, equipment 208C out of service and requesting a repair or routine maintenance be performed, and/or requesting another piece of equipment 208 be sent.

In another example, the information accessed may include operating parameters for equipment 208C or machine 110A that may be adjusted. The software may generate a user interface displaying user interface controls that are configured to accept input from a user such as supervisor 116B. The user input may be used by the software to issue commands or update operating parameters in machine 110A and/or equipment 208C.

These commands may be used for any suitable purpose. For example, the user interface may present buttons or other control options configured to control the machine to turn on or off, to activate or change an audible or visual signal such as by changing the color of a light or icon on a display (e.g. from red to yellow, from yellow to green, etc.). The control may optionally cause an indicator at the workstation, or on the equipment or machine to flash, cause an alarm to sound, or any combination thereof. The controls in the user interface generated by the software may optionally be configured to change the display of a schedule, graph, image, or any other aspect of a user interface displayed on a display device at the workstation, equipment, or machine to indicate a change in status or an update to current work flow such as to indicate the next task to work on.

In another example, the software my generate a user interface that includes controls for sending and/or installing an update to the control software in machine 110A, modifying the positioning of a tool operated automatically by machine 110A such as a drill bit, machining head, water jet nozzle, and the like. In another example, operating parameters may be changed such as the operating speed of a rotating tool such as a milling machine or drill bit. In another example, operating parameters may include the viscosity, fluid pressure, and/or application rate for a coating automatically applied by machine 110A. In yet another example, operating parameters may include duty cycle, speed of movement, and position for a robotic spot welder. In another example, the parameters These are but a few nonlimiting examples. The software may be configured to change the behavior of machines or equipment in the production environment based on identifying data broadcast by the beacon that may also be associated with information in the knowledge base.

Figure 4:
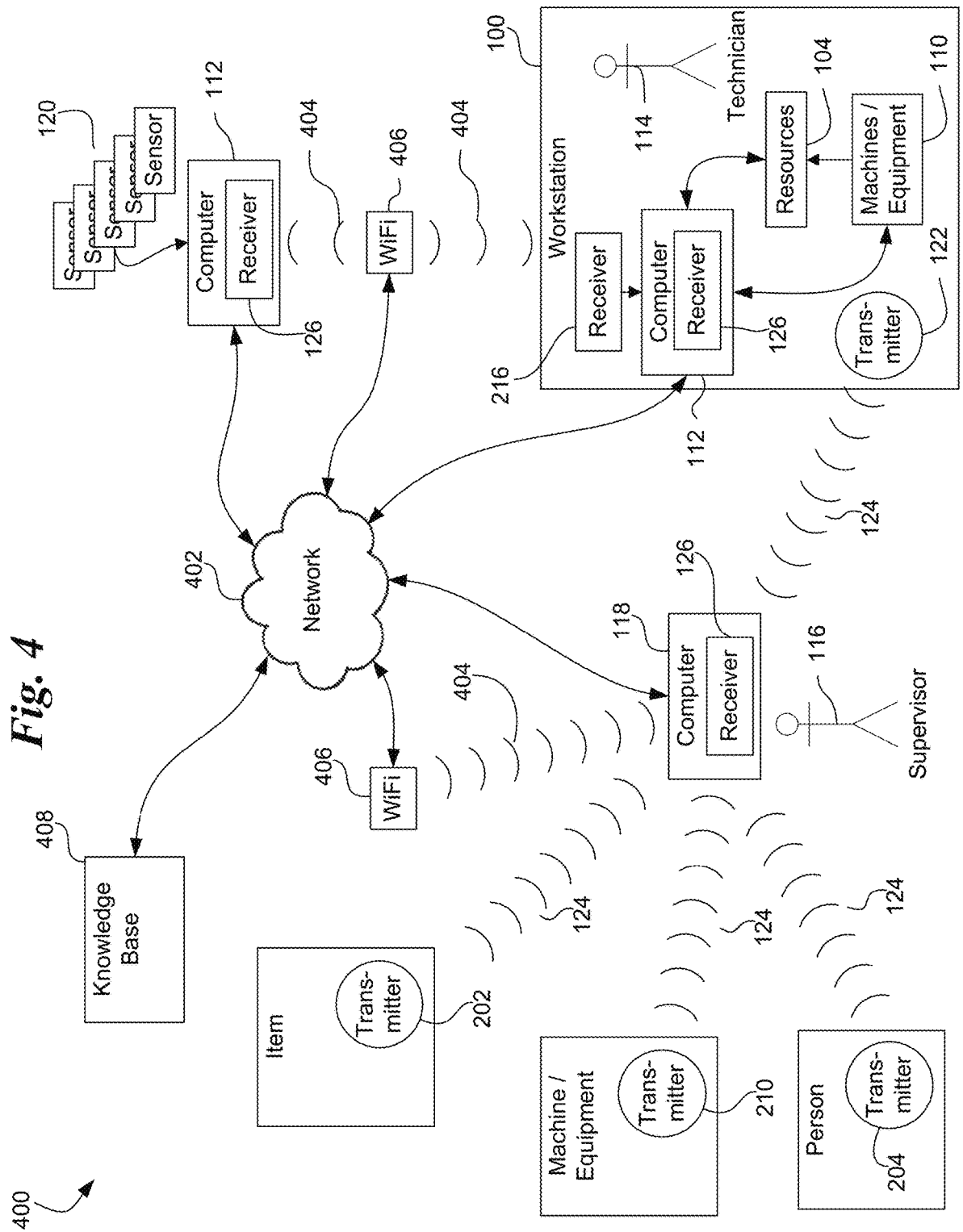
FIG. 4 is a schematic diagram illustrating an example of communication links between components of a system like the system in FIGS. 1-3.

One example of the relationship between beacons, computers, networks, and knowledge bases in the manufacturing environment is illustrated in FIG. 4 at 400. As discussed above, workstation, equipment, and personal beacons like beacons 122, 210, and 204 (and others) mentioned herein may be configured to supply a portion of the data necessary to retrieve information about the production environment. The broadcasted data may include a predefined string of alphanumeric characters uniquely identifying and distinguishing one broadcasting beacon from other broadcasting beacons. These beacons may broadcast data using a particular protocol. This protocol may be the same as, or different from, other networking and/or communication protocols used by various computers, networks, and related hardware and software in the manufacturing environment.

For example, beacons 122, 210, and 204 may use the Bluetooth® LE protocol to broadcast datagrams with fields uniquely identifying one beacon from another. This unique identifier may then be used by software executed on a computer 118 or 112 to initiate queries or requests using a separate network that utilizes the Transmission Control Protocol/Internet Protocol (TCP/IP) protocol connect to a knowledge base 408. The knowledge base may execute the queries or fulfill the requests in any suitable manner transmitting the data or reports to the requesting computer over the TCP/IP network. In other words, data received using a first network using a first networking protocol may be used to initiate requests for data using a second network and a corresponding second networking protocol.

As are illustrated in FIG. 4, a knowledge base 408 may communicate with a network 402 using the TCP/IP networking protocol to communicate between knowledge base 408 and computers 112 and 118. These connections may be wired connections, or wireless connections 404 using a Wi-Fi device 406. Data about the position of items in the manufacturing environment may be obtained by sensors 120 and passed to computer 112. As items move past a sensor 120, or set of sensors 120, the position of that item may be collected and updated in knowledge base 408 by a computer 112. The position of an item may also be automatically updated in the knowledge base 408 using workstation receivers 216 at workstations or at other known positions around the manufacturing environment. Receivers 126 may also be included in or coupled to computers 112 and may be configured to serve a similar function where computers 112 may be positioned in known locations such as at workstations 100 and 306. As items, people, machines, or equipment, or other devices with beacons transmitting identifying information move through the production process, knowledge base 408 may be updated based on the identifying information and the known position of receivers 126 and/or 216 in the production environment.

Figure 5:
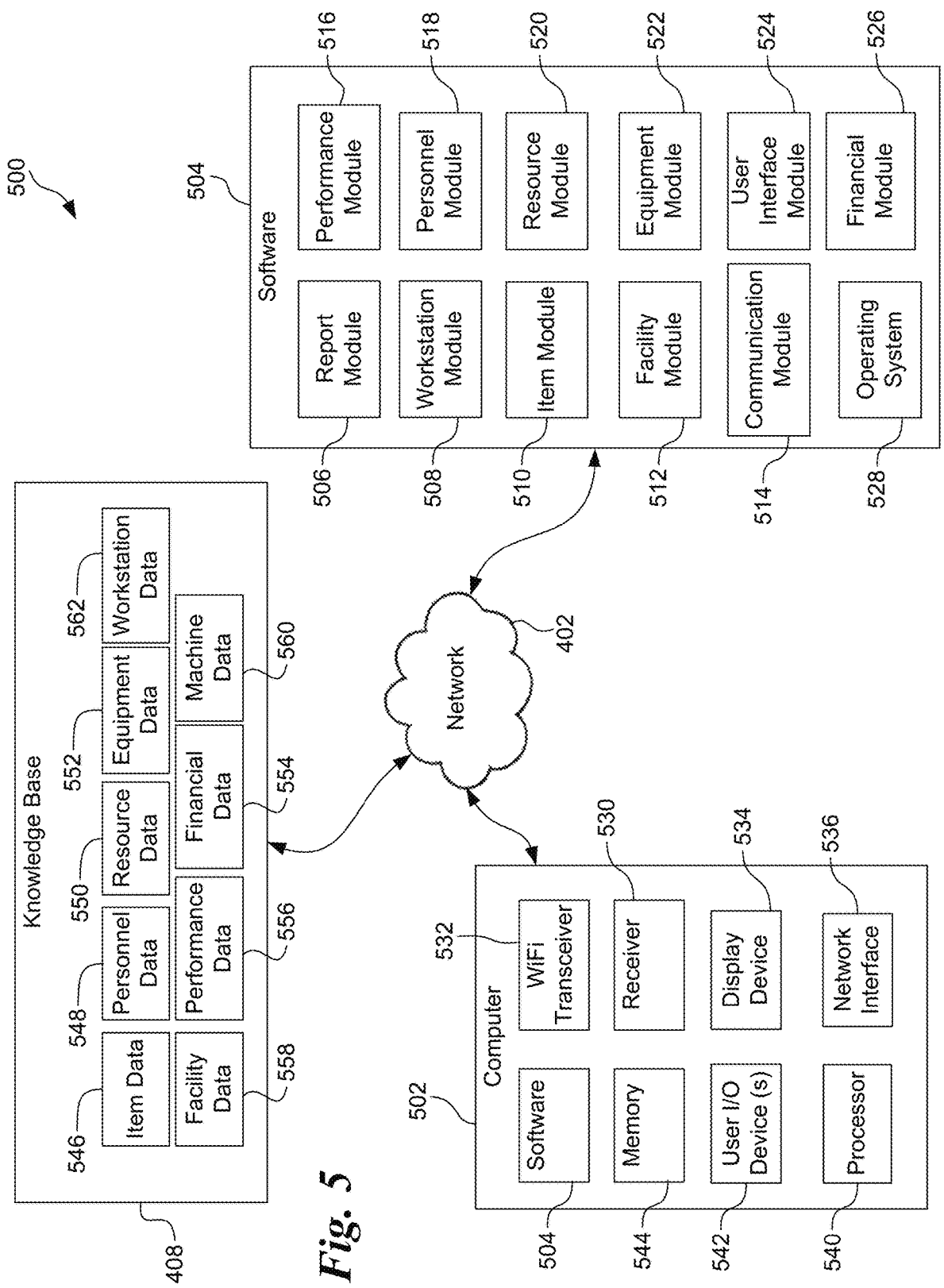
FIG. 5 is a schematic diagram illustrating an example of hardware, software, and data aspects of a system like the one in FIGS. 1-4.

Additional details regarding the software, hardware, and data aspects of a system like the one illustrated in FIG. 1-4 appears in FIG. 5 at 500. Knowledge base 408 may include data about items being manufactured 546, personnel 548, available resources 550, equipment 552, machines 560, workstations 562, financial aspects 554, performance aspects 556, and/or the facility 558. Data in knowledge base 408 may be accessed by a computer 502 which may be like computers 112 and/or 118. Computer 502 may be configured to operate according to instructions in software 504 which may include one or more software modules. Software 504 modules may insert, query, delete, and/or update data in knowledge base 408 using network 402. The illustrated software modules represent examples rather than a restrictive set. Any suitable software modules may be included. For example, some software modules may combine functionality from several of the modules illustrated at 500 while the functionality of some of the illustrated modules may be further separated into other modules.

A report module 506 may be included to configure computer 502 to generate reports illustrating data stored in knowledge base 408. Report module 506 may include statistical analysis and presentation algorithms for calculating and presenting statistical relationships using one or more data values. Report module 506 may also configure computer 502 to generate a graphical or textual report illustrating relationships between aspects of the manufacturing processes taking place. Some examples of such reports appear in FIGS. 8 and 9.

A workstation module 508 may be included, configuring computer 502 to perform workstation related functions such as responding to sensors 120 when an item is present in work area 128. Workstation module 508 may also configure computer 502 to collect data about resources consumed at a given workstation, collect data about available tools and machines used at a given workstation, monitor machine or equipment up time and/or downtime, monitor the activities of employees operating a given workstation, and the like.

Workstation module 508 may provide automatic updates to workstation related data. For example, workstation module may update status information in workstation data 562, facility data 558, equipment data 552, and/or machine data 560 when certain workstation related data values satisfy pre-configured rules. In one example, a rule may be triggered when a machine at a workstation is about to run out of a necessary resource such a wire for a wire welder, fasteners, paint, etc. In another example, a rule may be triggered when a machine at a workstation fails, requiring a temporary work stoppage for some or all of the workstations. This type of rule based updates or alerts may be used by any of the software modules 504 allowing supervisors and managers to configure alerts and updates as conditions change during the manufacturing process.

An item module 510 (or "job" module) may be included configuring computer 502 to access data about an item being manufactured or a job to be performed at the workstation. This data may include blueprints, schematics, diagrams, or other requirement documents. The data may also include when a task was started in relation to an item, whether the task was completed, and/or other status information related to the item at various stages of the manufacturing process. Item data 546 accessed by item module 510 may include a likelihood of meeting a target deadline, remaining tasks required to complete an item, remaining resources required versus resources available, and any tools, machines, equipment, and/or expertise necessary to complete the item. Any other suitable information about an item or job may be calculated or accessed by item module 510.

Figure 7:
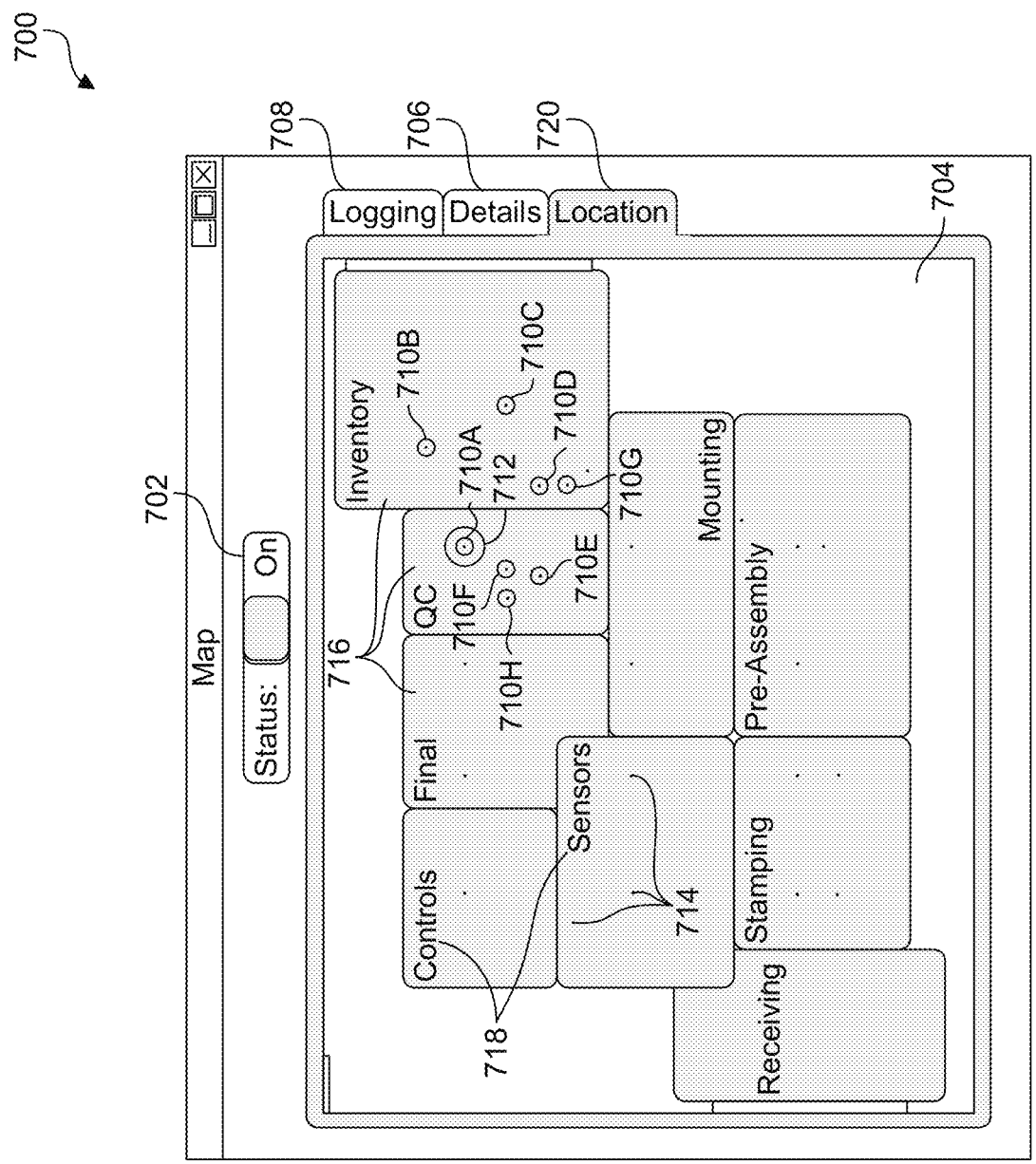
FIG. 7 is a diagram of one example of a user interface for locating and displaying a map of beacons in a manufacturing environment like the one illustrated in FIG. 3.
Figure 9:
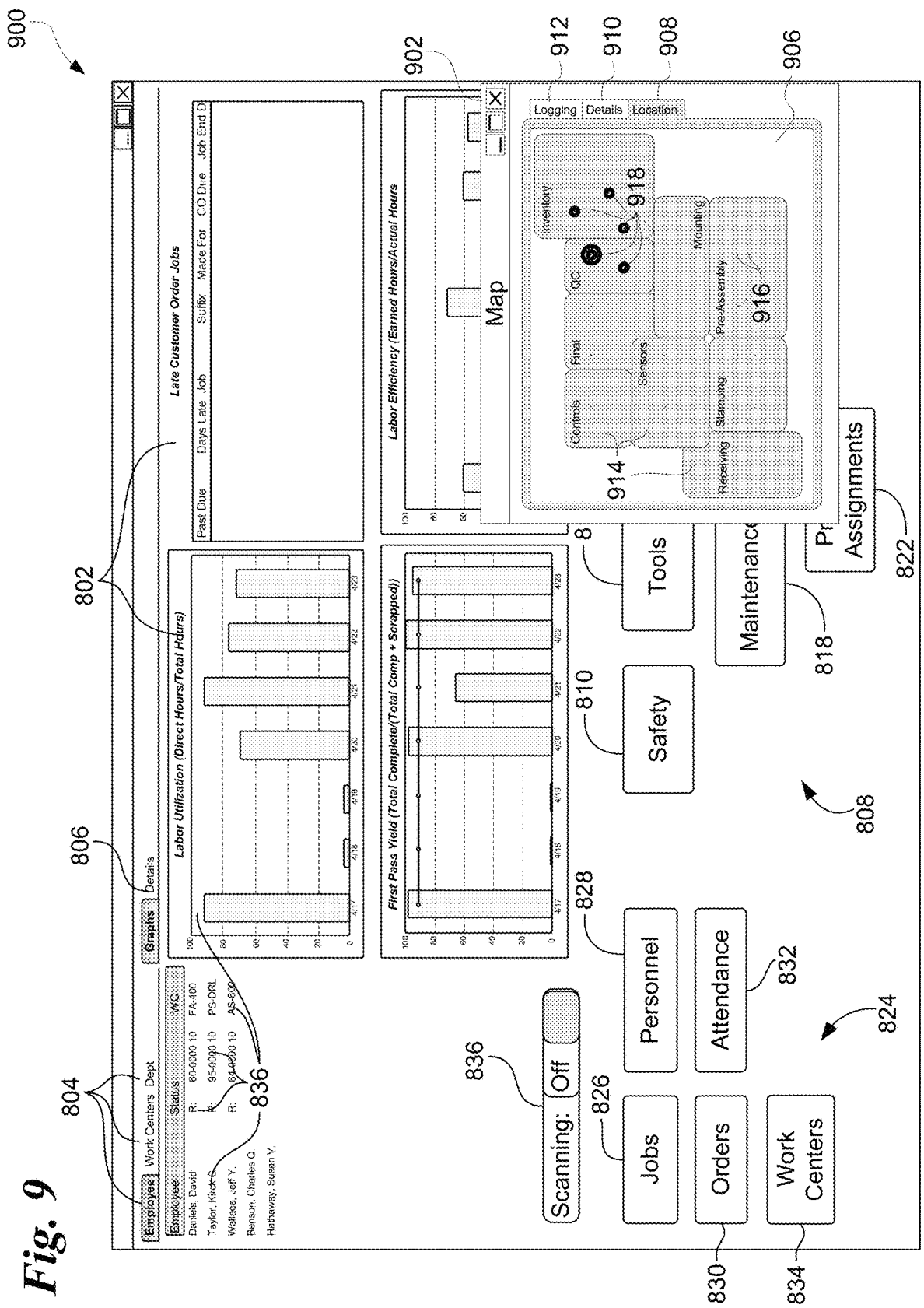
FIG. 9 is a diagram illustrating the user interface of FIG. 8 with a user interface like the one illustrated in FIG. 7.

A facility module 512 may be included for manipulating or accessing data about the manufacturing facility. This facility data may include references to workstation data 510, item data 546, personnel data 548, resource data 550, equipment data 552, financial data 554, and the like. Employee performance, facility performance, or other types of performance information may also be accessed by facility module 512. Facility module 512 may be configured to access blueprints, floor plans, workflow plans, details about maintenance of various aspects of facility such as heating ventilating and air conditioning, building code compliance information, and the like stored in knowledge base 408. Facility module 512 may also be instrumental in providing maps or layouts of beacons positioned around the facility, an example of which is illustrated in FIGS. 7 and 9 and discussed herein elsewhere.

A communication module 514 may be included to configure computer 502 to access data from various network resources including wired or wireless networks, as well as data that may be presented to computer 502 through a workstation beacon 122, item beacon 202, equipment beacon 210, and/or a personnel beacon 204. Communication module 514 may include software for communicating using multiple networking protocols and network devices. Communication module 514 may also monitor and send updates to knowledge base 408 indicating the availability of nearby beacons and any receivers used by computer 502.

A performance module 516 may be included for tabulating, collating, analyzing, organizing, querying, or otherwise manipulating data stored in knowledge base 408 to calculate or analyze performance related data. Performance metrics may include the uptime for a particular station, machine, piece of equipment, and/or facility into of usage rates for various resources such as fuel, parts, labor, and/or materials; production or task performance related to aspects of the production process. Performance module 516 may access personnel data 548 to determine employee productivity metrics such as amount of work produced per hour, cost per day for salaries and/or wages, trends in productivity, cost of production per unit time, productivity lost because of mistakes made in production, productivity lost because of sickness, vacation, or other time away from work.

Personnel module 518 may be configured to access data in knowledge base 408 such as personnel data 548 or performance data 556. Data about personnel may include performance evaluations, history of access to various facilities or computers, time away from work, time at work, current work assignments, team members and/or managers, salary history, and other work history related information for one or more employees or owners. Personnel data may include identifying information for employees such as name, address, facility or location within a facility, email address and the like. Personnel data may include credentials for logging into a corporate computer such as computer 502, knowledge base 408, and the like such as a username, password, biometric data such as fingerprints, or other identifying information used to distinguish one employee from another.

Software 504 may include a resource module 520 configured to access resource data 550, or any other resource related data in knowledge base 408. Resource module 520 may, for example, provide access to data about available supplies or resources used in the manufacturing process such as fuel, parts, subassemblies, raw materials, electricity, tools, machines, employees, and the like. Resource data 550 may also include data about network bandwidth, server capacity, available memory, and the like. Information about goods or services involved in the manufacturing process that may be used during the production of items or the performance of tasks may be available using resource module 520.

Equipment module 522 may include software for retrieving and organizing data such as equipment data 552 or machine data 560 used during the production process. Equipment data 552 may include data about any combination of the following: hand tools such as drills, saws, screwdrivers, and wrenches; power tools such as table saws, radial arm saws, welders, lathes, drill presses, milling machines, and the like; computers and other control devices for production or diagnostic work such as digital multimeters, oscilloscopes, electromagnetic signal strength testing devices, or general-purpose computers configured with modeling, diagnostic, quality control and/or testing software; production line equipment such as conveyors, sensors, manufacturing robots, lift trucks, pallet jacks; and/or heavy equipment such as cranes, excavators, loaders, trucks, cement mixers, cement pumps, road graders, bulldozers, tractors, and the like.

A user interface module 524 may also be provided for generating user interfaces with graphical buttons, windows, text boxes, selection boxes, and other widgets which may be accessible using any suitable input device such as a touch screen, mouse, or keyboard. User interface module 524 may also display various glyphs, figures, icons, graphs, charts, tabular displays, and the like which may or may not be modified or interacted with using any suitable input device. User interface module 524 may be used in conjunction with other software modules to provide navigational control between various presentations of information, to accept character or selection input from an input device, and/or to generate graphical displays on a display device of relevant data accessed by other software modules. User interface module 524 may operate in conjunction with operating system 528 which may include libraries of windowing widgets, basic input/output capabilities, and basic file system and network interfaces for user interface module 524 and for other software modules as well.

A financial module 526 may be included for accessing data from the knowledge base 408 related to financial aspects of manufacturing operations such as financial data 554 or other data. Data accessed, organized, or analyzed by financial module 526 may include cost data related to materials, equipment, goods, or services consumed in the production process, and/or cost data related to labor, utilities, and the like. Financial module 526 may provide cost or profit information for a given process involving particular parts, materials, resources, and/or employees. Financial module 526 may be used to generate information based on an individual station, a portion of a production environment including multiple stations, information about a single employee, or team of employees, or about a production line within a facility, or multiple production lines in multiple facilities.

Computer 502 may include various hardware and software components present in any computer discussed herein such as computers 112, and 118. Computer 502 may include any combination of software modules 504. Receiver 530 may operate like receiver 126 or 216 receiving electromagnetic signals such as signals transmitted by a beacon 122, 202, 204, 210, and other similar beacon. Multiple receivers 530 may be included as needed and configured to receive different wavelengths or ranges of frequencies transmitted by adjacent beacons. A Wi-Fi beacon and/or receiver 532 may be included as well for transmitting and receiving electromagnetic energy in frequency ranges used by wireless networking systems. Access to Wi-Fi may allow computer 502 to be carried about a facility or other work area while maintaining network access to knowledge base 408. A display device 534 may also be included such as a monitor or multiple monitors. A network device 536 may be included and configured to access network 402 or other networks using one or more networking protocols. A processor 540, user I/O devices 542, and memory 544 may be included in computer 502 as well.

Figure 6:
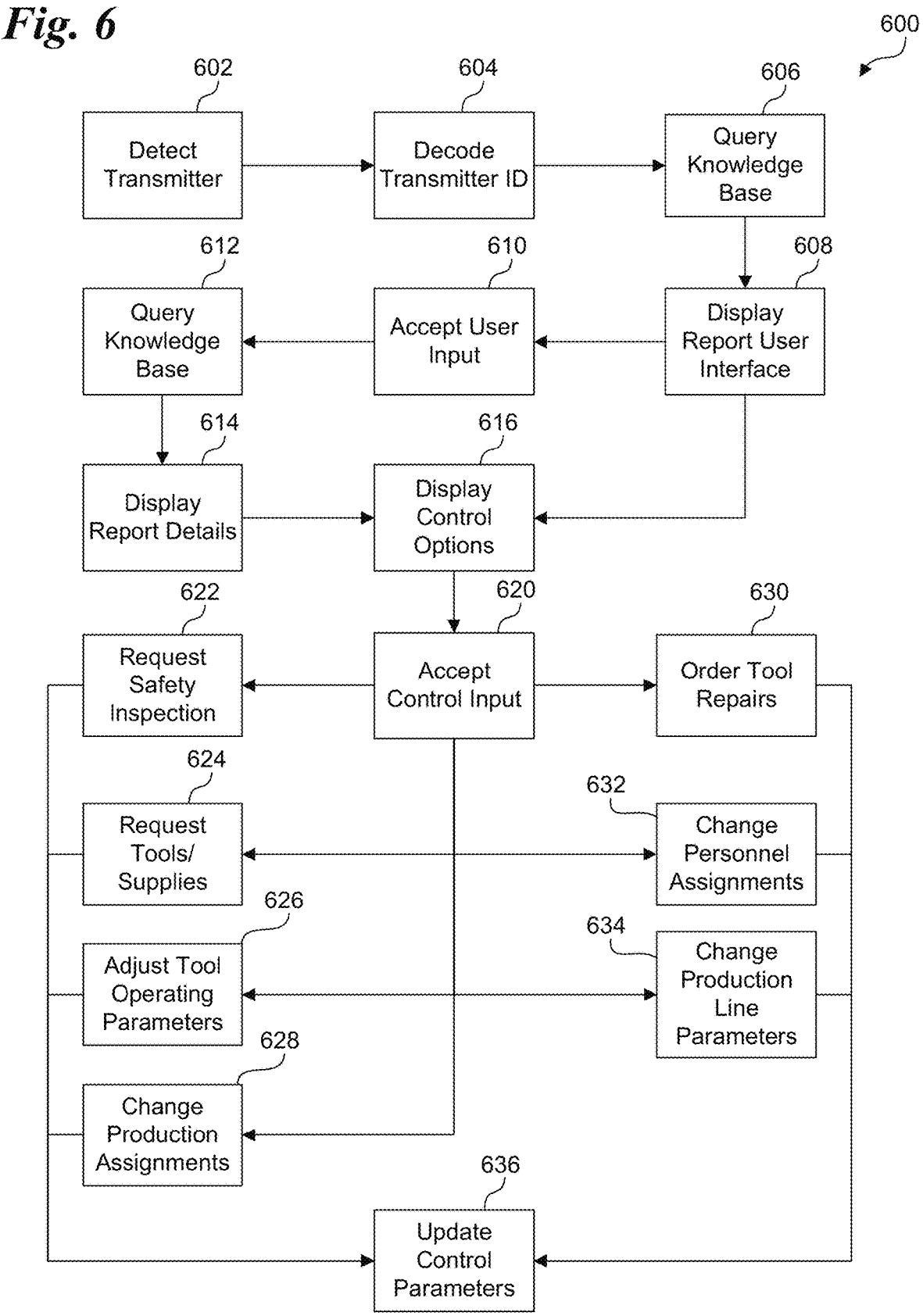
FIG. 6 is a flow chart illustrating one example of how a system like the system of FIGS. 1-5 may be used to monitor and control a manufacturing process.

One example of a process for monitoring and controlling a manufacturing environment according to the present disclosure is illustrated at 600 in FIG. 6. A computer such as a monitoring computer 118 may be repositioned from the first location to a second location allowing a receiver such as receiver 126 to detect a beacon at 602. Software 504 such as communication module 514 may decode data from the transmitted signal at 604, the decoded data may include an identifier that is optionally a unique identifier, and may include multiple data fields of the decoded data, or a single data field alone. The identifier may be used by any of the software modules 504 to query the knowledge base at 606 searching for relevant data for display in a report user interface at 608. Software modules such as report module 506 and user interface module 524 may be configured to generate reports and a user interface for displaying the reports.

The report user interface may include user interface controls configured to accept input from a user for requesting additional reports or data. The user interface module may also be configured to display control options at 616 allowing a user to adjust the operation of the manufacturing environment as discussed herein elsewhere. If a user wants more reports or data, user input defining a request or query for the additional information may be accepted from the user at 610. Another query or series of queries to knowledge base 408 may be executed at 612 and the results processed by report module 506 and user interface module 524 at 614. One or more control options may be displayed by user interface module 524 at 616 providing a user with control options based on the data retrieved from knowledge base 408.

The system may accept control input from a user at 620 using the control options displayed at 616. Any suitable control options may be provided by the user interface module 524. The user may for example provide input defining a request for a safety inspection of a particular station, facility, area of the production line, and the like at 622. Control input may also include input defining a request for new, additional, or replacement tools or supplies at 624. Input 620 may include input defining an adjustment to the operating parameters for a tool, machine, or other equipment used in the production process at 626. Control input 620 may include input defining a change to production assignments at 628, or an order for repairs at 630. Other examples include input defining a request for a personnel change at 632, a request to reassign personnel to different tasks, or a change in overall production line parameters at 634. Such production line parameters may include the speed at which items move along an automated production line, the introduction or removal of stations along the line, the addition or removal of required resources, goods, or services, and the like.

Control input from 620 may be accepted by the user interface and any corresponding changes to the control parameters updated at 636. The resulting change to the production process, machinery, equipment, work assignments, and the like may then take place immediately, be reviewed for approval by others in the organization before implementation, or be scheduled for later implementation such as during off hours or during a previously scheduled period of inactivity. Thus a manager, supervisor, or other employee using a computer such as a personal computing device may move about a production facility obtaining data about nearby production stations, equipment, or items allowing an organization to make adjustments to changing conditions in the manufacturing environment.

Interactions with beacons positioned around a manufacturing facility may be aided by a user interface that includes a map display like the map display illustrated in FIG. 7 at 700. Such an interface may be displayed by user interface module 524 alone or in conjunction with other modules such as workstation module 508 and facility module 512. User interface 700 may include a facility map display 704 according to facility data 558, equipment data 552, and/or workstation data 562. The map display may be configured to appear when the location control 720 is selected. The display may be configured in any suitable manner and may include areas 716 delimited by lines, shading, or other indicia indicating one or more areas within the production environment where certain aspects of the manufacturing process take place. These aspects may be labeled accordingly with labels 718.

Indicia 714 such as dots, icons, and the like, may appear in map display 704 indicating the location of one or more beacons like beacons 122, 202, 204, 210, and 530. The indicia 714 may include colors or other indications of the type of beacon at a given location. For example workstation beacons 122 may appear with indicia 714 that is a different color than an indicia 714 indicating the presence of any other kind of beacon. In another example, item beacons 202 may be presented as yellow, equipment beacons 210 may be presented as green, and so forth.

Marking indicia 710 may appear as one or more rings around indicia 714 indicating which beacons are currently transmitting data that is being received by a receiver coupled to the computer displaying interface 700. Additional indicators such as additional rings 712 may indicate the transmitted data that is currently being used to generate reports, and may further indicate the current workstation, machine, etc. to which, or about which, any control updates may be sent. The user may then select an available beacon by any suitable means such as using an input device like a pointing device or by touching the display device.

Indicia 714 may temporarily appear or disappear in map display 704, or may move around within map display 704. For example, to the extent that map display 704 corresponds with the production environment illustrated in FIG. 3, the current receiver may be receiver 126 in computer 118A carried by supervisor 116A. The resulting indicia 710E corresponds to item beacon 202A, 710H corresponds to a personal beacon 204A, 710F corresponds to personal beacon 204B, 710A corresponds to workstation beacon 112A, 710G corresponds to personal beacon 204C, 710D corresponds to item beacon 202B, and 710B and 710C correspond to equipment beacons 210B and 210A respectively. Item beacons are coupled to items 102 meaning that as these items pass through the work environment, indicia 710E and 710D may move around map display 704, and eventually disappear from map display 704 when the beacons coupled to these items move out of range of computer 118A. The relative positioning of, and movement of, indicia 710 may be obtained, for example, based on signal strength data sent by the beacons within range of the current receiver. Such positioning information may be useful for confirming the location and type of beacon the corresponding indicia 710 represents. The same may be said for indicia 710F, 710G, and 710H which correspond to personal beacons 204B, 204C, and 204A respectively. These beacons may also move because they are carried by technicians 114B, manager 206A, and technician 114A.

An activation control 702 may be configured to control communication module 514 to activate or deactivate a receiver like receiver 126 or receiver 530. A details display providing additional information about the current and/or other available beacons may be displayed by selecting the details user interface control 706. A logging or debugging display may be included and accessed by selecting the logging user interface control 708. The logging display may be helpful to, for example, troubleshoot problems arising from the hardware, software, and network interactions taking place between nearby beacons, the hardware aspects of the computer displaying the user interface 700, the installed software modules 504, network 402, and knowledge base 408.

Indicia 710 and/or 714 may appear and disappear as the signals broadcasted from nearby beacons become attenuated beyond the current receiver's ability to receive the data being sent. User interface module 524 and/or communication module 514 may be configured to interpret received signal strength data provided by the current receiver to determine when and where to display indicia 710/714 for a given beacon. When the received signal strength calculations yield a result that is above a first predetermined target or threshold, the corresponding indicia 710/714 may appear in map display 704. One or more indicia 710/714 may be removed from map display 704 when the received signal strength calculation yields a result that is below a second predetermined target. The first and second predetermined target values may be the same value, or they may be different values. If different values are used, this difference may be manually or automatically configured to allow indicia to remain in the display longer when the signal strength begins to weaken. Beacons with values between the first and second target thresholds may be presented using additional indicia in map display 704 such as a change in color, an additional icon, and the like, indicating that transmission is weakening and may be nearing the limit of the receiver's ability to detect it.

Figure 8:
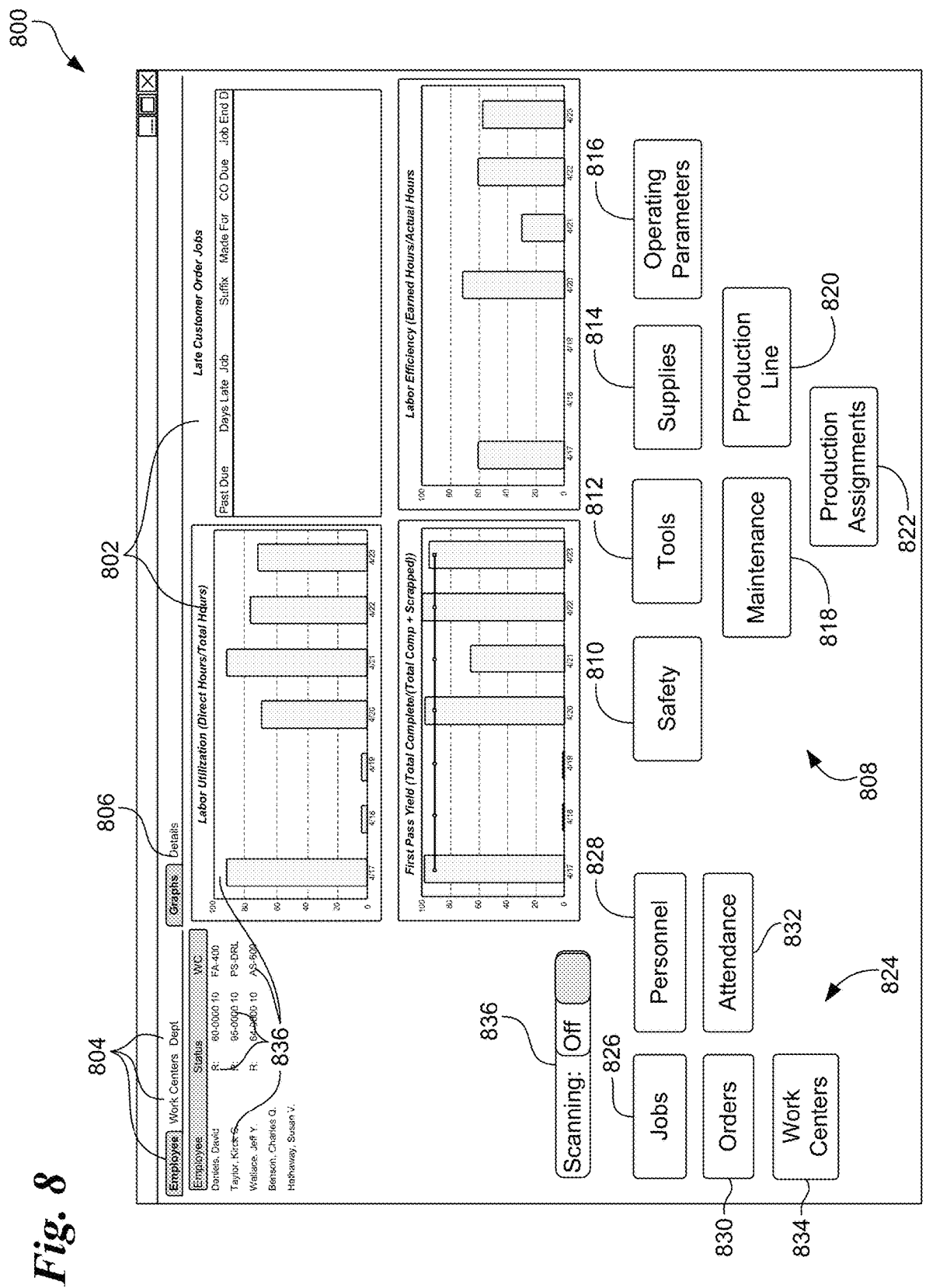
FIG. 8 is a diagram of one example of a user interface for displaying data and control options for monitoring and controlling a manufacturing environment like the illustrated in FIGS. 1-7.

User interface module 524, report module 506, and any other software modules 504 may be configured to create the report user interface shown in FIG. 8 at 800. One or more charts or graphs 802 with graphical or textual representations of data 836 may be generated and displayed. Report controls 804 may be included providing options for additional reporting and/or additional query functionality.

Detailed information from knowledge base 408 may be retrieved and/or displayed using a details control 806. Control options 808 may be displayed (e.g. see FIG. 6 at 616) providing options for controlling the production environment. In the illustrated example, safety control 810 may be configured to accept input from a user causing the user interface module 524 to display additional safety related controls such as controls for requesting a safety inspection (see FIG. 6 at 622). A tool control 812 may be configured to display a user interface with additional controls for requesting tools, while a supplies control 814 may be configured to display a user interface with additional controls for requesting new supplies or additional quantities of existing supplies. The operating parameters control 816 may be configured to open a user interface with controls configured to adjust operating parameters for a given station, machine, tool, piece of equipment, and the like. A maintenance control 818 may be configured to generate a user interface for requesting maintenance. A production line control 820 may be configured to generate a user interface with controls configured to adjust production line parameters thus reallocating resources, machines, equipment, or employees, adjusting the rate of production, etc. Production assignments control 822 may be configured to display a user interface with controls configured to adjust production assignments for stations, equipment, tools, employees, and the like.

Other control options 824 may provide query and reporting for items 826, personnel related matters 828, orders 830, attendance related matters 832, and work center related issues 834. A receiver control 836 may also be shown in user interface 800. The receiver control may be configured to activate or deactivate the current receiver such as a receiver 126.

An example of user interface 800 with the current receiver set to scan for available beacons (836) is illustrated in FIG. 9 at 900. User interface 900 is similar to user interface 800 with the addition of a window 902 having a user interface similar to user interface 700 in FIG. 7. In window 902 is shown a map display 906 with location control 908, details control 910, and a logging control 912. As illustrated, location control 908 is selected indicating the relative locations of one or more beacons 916 within regions 914 using indicia such as icons, symbols, and colors as discussed above. Additional indicia 918 are shown based on proximity to the receiver. User interface 900 may display indicia 918 in relation to some beacons indicating they are close enough to the receiver to send identifying data. Separate indicia indicating which beacon has been chosen appears at 904. Thus the data and information in the reports and controls appear in the user interface 900 based on the selection of a nearby beacon 916 displayed in window 902.

The concepts illustrated and disclosed herein include, or may also be configured according to, any of the following numbered non-limiting examples:

Example 1

A system for controlling an apparatus in a production environment according to user input, comprising a server coupled to the apparatus by a computer network, the server having a database that includes the present values for one or more operating parameter values indicating a current operating status of the apparatus;
a wireless transmitter adjacent the apparatus, the transmitter configured to automatically transmit data packets wirelessly, the data packets including a reference value representing the expected signal strength of the transmitter at a fixed distance; and
a portable computer wirelessly coupled to the computer network, the computer including a processor and an input device, a display device, and a receiver coupled to the processor;
wherein the portable computer is configured to automatically receive the data packets from the transmitter via the receiver, wherein the receiver is configured to measure the received strength of signals sent by the transmitter, and wherein the portable computer is configured to compare the reference value in the data packets and the received signal strength from the receiver to determine a current distance between the transmitter and the portable computer;
wherein the portable computer is configured to display a user interface, and to switch the user interface to an apparatus specific user interface that includes the one or more operational parameter values for the apparatus when the computer crosses a predetermined threshold distance from the transmitter;
wherein the portable computer's input device is configured to accept input from the user and to send the input to the apparatus.

Example 2

The system of Example 1, wherein the apparatus is configured to change its operation according to the input from the user.

Example 3

The system of Example 1, wherein the database includes the present value for a control parameter associated with the apparatus;
wherein the apparatus specific user interface includes the control parameter;
wherein the portable computer's input device is configured to accept input changing the value of a control parameter from a present value to a new value;
wherein the portable computer is configured to communicate the new value of the control parameter to the server; and
wherein the apparatus is configured to retrieve the new value of the control parameter from the server and to change its operation accordingly.

Example 4

The system of any preceding Example, wherein the portable computer is configured to receive the data packets from multiple transmitters in the production environment;
wherein the portable computer is configured to calculate the multiple corresponding distances between the multiple transmitters and the portable computer using the reference value in the data packets and the received signal strength for each of the multiple transmitters; and wherein the portable computer is configured to display a map user interface using the display device, the map user interface configured to display indicia indicating that the portable computer is within the predetermined threshold distance from each of the one or more transmitters.

Example 5

The system of any preceding Example, wherein one of the multiple transmitters is the transmitter associated with the apparatus, and/or
wherein one of the multiple transmitters is an equipment transmitter associated with equipment configured to move within the production environment independent of the portable computer and the apparatus; and
wherein the portable computer is configured to display an equipment user interface using the display device, the equipment user interface displaying equipment performance information when the portable computer is within the predetermined distance from the equipment transmitter.

Example 6

The system of any preceding Example, wherein one of the multiple transmitters is an employee transmitter associated with an employee within the production environment; and
wherein the portable computer is configured to display an employee user interface using the display device, the employee user interface displaying employee performance information when the portable computer is within the predetermined distance from the employee transmitter.

Example 7

The system of any preceding Example, wherein the multiple transmitters includes one or more product transmitters associated with corresponding one or more products produced in the production environment using the apparatus; and wherein the portable computer is configured to display a product user interface using the display device, the product user interface displaying product information when the portable computer is within the predetermined distance from the product transmitter.

Example 8

The system of any preceding Example, wherein the database includes tracking information associating users of the portable computer with requests for transmitter specific parameters made when the computer is within the predetermined threshold distance from the transmitter; and wherein the portable computer is configured change the tracking information associated with the transmitter to include user identifying information for a given user of the portable computer and a timestamp indicating when the portable computer requested the one or more parameter values associated with the transmitter.

Example 9

The system of Example 8, wherein the portable computer is configured to send a request to the server for tracking information specific to the transmitter, and wherein the computer is configured to display a tracking user interface configured to display the tracking information specific to the transmitter.

Example 10

The system of any preceding Example, wherein the transmitted data packets include a preamble, one or more header fields, an access address field, a Cyclical Redundancy Check (CRC) field, a Protocol Data Unit (PDU) field, a Media Access Control (MAC) address field, and a data field; and wherein the reference value is the strength of a signal transmitted by the transmitter and measured at a predetermined distance from the transmitter.

Example 11

The system of any preceding Example, wherein the transmitter is mounted to the apparatus.

Example 12

A method of controlling an apparatus in a production environment according to user input, comprising wirelessly transmitting data packets from a beacon transmitter associated with an apparatus, wherein the transmitter is configured to transmit data packets that include:
a machine identifier for the apparatus, and;

a reference value representing the expected signal strength of the transmitter at a fixed distance;

automatically receiving the data packets from the transmitter using a computer with a wireless receiver;

using the computer to calculate a current distance between the transmitter and the computer based on a received signal strength of the received signal and the reference value sent in the data packets;

displaying a user interface using the display device of the computer and switching the user interface to an apparatus specific user interface when the computer moves within a predetermined threshold distance from the transmitter, the apparatus specific user interface displaying one or more operational parameter values for the apparatus;

using the computer's input device to accept input from the user; and sending the input from the user to the apparatus using the computer.

Example 13

The system of Example 12, wherein the apparatus is configured to change its operation according to the input from the user.

Example 14

The method of any one of Examples 12 or 13, comprising using an input device of the computer to accept input changing the value of a control parameter presented in the machine specific user interface from a present value to a new value;

using the computer to communicate the new value of the control parameter over a computer network to a server configured to store the new value of the control parameter; and retrieving the new value of the control parameter from the server and controlling the operation of the manufacturing apparatus accordingly using a machine controller, wherein the machine controller is in communication with the server via the computer network.

Example 15

The method of any one of Examples 12-14, comprising receiving the data packets from multiple transmitters in the production environment using the receiver;

calculating the multiple corresponding distances between the multiple transmitters and the portable computer using the reference value in the data packets using the computer;

displaying a map user interface using the display device of the computer, wherein the map user interface is controlled by the computer to display indicia indicating which ones of the one or more transmitters have corresponding distances from the computer that are within the predetermined distance from the transmitter.

Example 16

The method of Example 15, comprising displaying an equipment user interface using the display device, the equipment user interface displaying equipment performance information when the computer is within the predetermined distance from an equipment transmitter;

wherein the equipment transmitter is one of the multiple transmitters and is associated with equipment that is movable within the production environment independent of the computer and the manufacturing apparatus.

Example 17

The method of Example 15, comprising displaying an employee user interface using the display device, the employee user interface displaying employee performance information when the computer is within the predetermined distance from an employee transmitter;
wherein the employee transmitter is one of the multiple transmitters within the production environment and is kept by employees.

Example 18

The method of Example 17, wherein the employee performance information includes information about how frequently a specific employees passes within the predetermined threshold distance for each of the multiple transmitters in the production environment.

Example 19

The method of any preceding Example, comprising repositioning the computer from a location where the user interface is displayed, to a another different location so that a different machine specific user interface is displayed.

Example 20

The method of any preceding Example, wherein the transmitted data packets include a preamble, one or more header fields, an access address field, a Cyclical Redundancy Check (CRC) field, a Protocol Data Unit (PDU) field, a Media Access Control (MAC) address field, and a data field.

Example 21

The method of any preceding Example, wherein the transmitter is mounted to the apparatus.

Example 22

The method of any preceding Example, wherein the transmitter is mounted to a workstation, and wherein the apparatus is positioned at the workstation.

Example 23

A method of monitoring and controlling a production environment, comprising wirelessly transmitting data packets from a beacon transmitter positioned at a location in the production environment, wherein the beacon transmitter is configured to transmit data packets that include:
  a location identifier for the location, and;
  a reference value representing the expected signal strength of the beacon transmitter at a fixed distance;
accepting user credentials identifying a user of a computer in the production environment, the computer having a user interface displayed on a display device and a receiver configured to receive data packets from the beacon transmitter, the computer coupled to a server by a computer network;
using the computer to calculate a current distance between the beacon transmitter and the computer based on a received signal strength of the received signal and the reference value sent in the data packets; and
automatically triggering the computer to display a location specific user interface on the computer's display device, wherein the computer is automatically triggered by the beacon transmitter to switch the user interface to a location specific user interface when the computer moves within a predetermined threshold distance from the transmitter, wherein the location specific user interface includes information retrieved from the server that is specific to operations occurring at that location in the production environment, wherein the location specific user interface is configured to accept user input.

Example 24

The method of Example 23, comprising accepting user input selecting an employee user interface using the input device of the computer, and displaying the employee user interface using the display device when the computer is within the predetermined distance from the beacon transmitter at the location;
wherein the employee user interface includes current work assignments, team members working at the location, a history of employee time working at the location, a history of employee time away from the location, and cost of production per unit of time, and any combination thereof.

Example 25

The method of Examples 23 or 24, comprising accepting user input selecting an equipment user interface using the input device of the computer, and displaying the equipment user interface using the display device when the computer is within the predetermined distance from the beacon transmitter at the location;
wherein the location is a piece of equipment in the production environment; and
wherein the equipment user interface includes equipment downtime, equipment uptime, cost of operating equipment, equipment maintenance schedules, current work assignments in the production environment, and any combination thereof.

Example 26

The method of any one of Examples 23-25, comprising accepting user input selecting a workstation user interface using the input device of the computer, and displaying the workstation user interface using the display device when the computer is within the predetermined distance from the beacon transmitter at the location;
wherein the location is a workstation in the production environment; and
wherein the workstation user interface includes information about parts or subassemblies manufactured at a workstation, employees at the workstation, work stoppages, raw materials consumed, costs of operating the workstation, number of parts or subassemblies produced over a predetermined period of time, profit margin for the workstation, and any combination thereof.

Example 27

The method of any one of Examples 23-26, comprising repositioning the computer from a location where the user interface is displayed, to a another different location so that a different location specific user interface is displayed.

Example 28

The method of any one of Examples 23-27, wherein the transmitter is mounted to a part or subassembly that is produced in the production environment, and wherein the computer is a portable computer mounted to a workstation within the production environment.

Example 29

The method of any one of Examples 23-28, comprising using the computer to communicate the value of a control parameter over the computer network to a workstation computer at the location, the computer and the workstation computer coupled together by the computer network;
wherein the location is a workstation with a workstation computer having a display device configured to change the status of the workstation in response to the control parameter, and to display the update status information using the display device.

Example 30

The method of any one of Examples 23-29, comprising automatically sending tracking information to the server using the computer, the tracking information including:
a timestamp indicating when the computer was automatically triggered by the beacon transmitter; and
at least a portion of the user credentials identifying the user of the computer.

Example 31

A system for monitoring and controlling a production environment, comprising a manufacturing apparatus having a machine controller configured to control the manufacturing apparatus according to a present value of a control parameter;
a server coupled to the machine controller by a computer network, the server having a database that includes the present value for the control parameter and one or more operating parameter values indicating a current operating status of the manufacturing apparatus;
a wireless transmitter adjacent the manufacturing apparatus, the transmitter configured to automatically transmit data packets wirelessly, the data packets including a reference value representing the expected signal strength of the transmitter at a fixed distance; and
a portable computer wirelessly coupled to the computer network, the computer including a processor and an input device, a display device, and a receiver coupled to the processor;
wherein the portable computer is configured to automatically receive the data packets from the transmitter via the receiver, wherein the receiver is configured to measure the received strength of the signal, and wherein the portable computer is configured to compare the reference value in the data packets and the received signal strength from the receiver to determine a current distance between the transmitter and the portable computer;
wherein the portable computer is configured to display a user interface, and to switch the user interface to a machine specific user interface that includes the control parameter and one or more operational parameter values for the manufacturing apparatus when the computer crosses a predetermined threshold distance from the transmitter;
wherein the portable computer's input device is configured to accept input changing the value of the control parameter from the present value to a new value;
wherein the portable computer is configured to communicate the new value of the control parameter to the server; and
wherein the machine controller is configured to retrieve the new value of the control parameter from the server and to adjust operation of the manufacturing apparatus accordingly.

Example 32

A system for managing a production environment, comprising one or more wireless transmitters in the production environment, wherein the transmitters are configured to automatically transmit data packets wirelessly, the data packets including a reference value representing the expected signal strength of the transmitter at a fixed distance, and a transmitter specific identifier individually identifying the one or more transmitters;
a database coupled to a computer network, the database storing one or more parameter values and user tracking information associated with the transmitters in the production environment; and
a portable computer wirelessly coupled to the computer network, the computer including a processor, a memory, an input device, a display device, and a receiver coupled together;
wherein the input device is configured to accept user credentials identifying a user for the portable computer;
wherein the portable computer is configured to automatically receive the data packets from a transmitter of the one or more wireless transmitters via the receiver, wherein the receiver is configured to measure a received strength of signals transmitted by the transmitter, and wherein the portable computer is configured to compare the reference value in the data packets and the received signal strength from the receiver to determine a current distance between the portable computer and a transmitter of the one or more transmitters;
wherein the portable computer is configured to automatically use the user credentials and transmitter specific identifier from the received data packets to automatically request from the database the one or more parameter values associated with the transmitter when the portable computer crosses a predetermined threshold distance from the transmitter;
wherein the portable computer is configured to display a user interface, and to switch the user interface to display the one or more transmitter specific parameter values retrieved from the database when the portable computer crosses the predetermined threshold distance from the transmitter; and wherein the portable computer is configured change the user tracking information associated with the transmitter to include at least some of the user credentials identifying the user of the portable computer and a timestamp indicating when the portable computer requested the one or more parameter values associated with the transmitter.

Example 33

The system of any one of Examples 31 or 32, wherein the portable computer is configured to receive the data packets from multiple transmitters in the production environment, wherein the portable computer is configured to calculate the multiple corresponding distances between the multiple transmitters and the portable computer using the reference value in the data packets and the received signal strength for each of the multiple transmitters; and wherein the portable computer is configured to display a map user interface using the display device, the map user interface configured to display indicia indicating that the portable computer is within the predetermined threshold distance from each of the one or more transmitters.

Example 34

The system of any one of Examples 31-33, wherein one of the multiple transmitters is the transmitter associated with the manufacturing apparatus, and/or wherein one of the multiple transmitters is an equipment transmitter associated with equipment configured to move within the production environment independent of the portable computer and the manufacturing apparatus; and wherein the portable computer is configured to display an equipment user interface using the display device, the equipment user interface displaying equipment performance information when the portable computer is within the predetermined distance from the equipment transmitter.

Example 35

The system of any one of Examples 31-34, wherein one of the multiple transmitters is an employee transmitter associated with an employee within the production environment; and wherein the portable computer is configured to display an employee user interface using the display device, the employee user interface displaying employee performance information when the portable computer is within the predetermined distance from the employee transmitter.

Example 36

The system of any one of Examples 31-35, wherein the multiple transmitters includes one or more product transmitters associated with corresponding one or more products produced by the manufacturing apparatus in the production environment; and wherein the portable computer is configured to display a product user interface using the display device, the product user interface displaying product information when the portable computer is within the predetermined distance from the product transmitter.

Example 37

The system of any one of Examples 31-36, wherein the portable computer is configured to use the receiver to automatically detect the transmitter;

wherein the transmitter is configured to transmit a transmitter ID identifying the transmitter in the data packets sent to the portable computer by that transmitter; and wherein the portable computer is configured to decode the transmitter ID.

Example 38

The system of any one of Examples 31-37, wherein the portable computer is configured to retrieve from the server the control parameter value and the one or more operational parameter values associated with the manufacturing apparatus.

Example 39

The system of any one of Examples 31-38, wherein the received signal strength is a Received Signal Strength Indication (RSSI).

Example 40

The system of any one of Examples 31-39 wherein the transmitted data packets include a preamble, one or more header fields, an access address field, a Cyclical Redundancy Check (CRC) field, a Protocol Data Unit (PDU) field, a Media Access Control (MAC) address field, and a data field; and wherein the reference value is the strength of a signal transmitted by the transmitter and measured at a predetermined distance from the transmitter.

Example 41

The system of any one of Examples 31-40, wherein the transmitted data packets comprise a data field that includes a prefix, a proximity Universal Unique Identifier (UUID), a major field, a minor field, and a transmission power field containing the reference value; and wherein the reference value is a numerical value representing a Received Signal Strength Indication (RSSI) of the transmitter measured at a predetermined distance from the transmitter.

Example 42

The system of any one of Examples 31-41, wherein the transmitter is mounted to the manufacturing apparatus.

Example 43

A method of monitoring and controlling a production environment, comprising wirelessly transmitting data packets from a transmitter associated with a manufacturing apparatus, wherein the transmitter is configured to transmit data packets that include:

a machine identifier for the manufacturing apparatus, and;

a reference value representing the expected signal strength of the transmitter at a fixed distance;

automatically receiving the data packets from the transmitter using a computer with a wireless receiver;

using the computer to calculate a current distance between the transmitter and the computer based on a received signal strength of the received signal and the reference value sent in the data packets;

displaying a user interface using the display device of the computer and switching the user interface to a machine specific user interface when the computer moves within a predetermined threshold distance from the transmitter, the machine specific user interface displaying a control parameter and one or more operational parameter values for the manufacturing apparatus;

using an input device of the computer to accept input changing the value of the control parameter in the machine specific user interface from the present value to a new value;

using the computer to communicate the new value of the control parameter over a computer network to a server configured to store the new value of the control parameter; and retrieving the new value of the control parameter from the server and controlling the operation of the manufacturing apparatus accordingly using a machine controller, wherein the machine controller is in communication with the server via the computer network.

Example 44

The method of Example 43, comprising receiving the data packets from multiple transmitters in the production environment using the receiver;

calculating the multiple corresponding distances between the multiple transmitters and the portable computer using the reference value in the data packets using the computer;

displaying a map user interface using the display device of the computer, wherein the map user interface is controlled by the computer to display indicia indicating which ones of the one or more transmitters have corresponding distances from the computer that are within the predetermined distance from the transmitter.

Example 45

The method of Example 44, comprising displaying an equipment user interface using the display device, the equipment user interface displaying equipment performance information when the computer is within the predetermined distance from an equipment transmitter;

wherein the equipment transmitter is one of the multiple transmitters and is associated with equipment that is movable within the production environment independent of the computer and the manufacturing apparatus.

Example 46

The system of Example 44 or 45, comprising displaying an employee user interface using the display device, the employee user interface displaying employee performance information when the computer is within the predetermined distance from an employee transmitter; wherein the employee transmitter is associated with an employee and is one of the multiple transmitters within the production environment.

Example 47

The method of any one of Examples 44-46, comprising displaying a product user interface using the display device, the product user interface displaying product information when the computer is within the predetermined distance from a product transmitter;

wherein the product transmitter is associated with corresponding one or more products produced by the manufacturing apparatus in the production environment; and wherein the product transmitter is one of the multiple transmitters within the production environment.

Example 48

The method of any one of Examples 43-47, comprising repositioning the computer from a location where the user interface is displayed, to a another different location so that a different machine specific user interface is displayed.

Example 49

The method of any one of Examples 43-48, comprising retrieving from the server the control parameter value and the one or more operational parameter values associated with the manufacturing apparatus using the computer.

Example 50

The method of any one of Examples 43-49, wherein the received signal strength is a Received Signal Strength Indication (RSSI).

Example 51

The method of any one of Examples 43-50, wherein the transmitted data packets include a preamble, one or more header fields, an access address field, a Cyclical Redundancy Check (CRC) field, a Protocol Data Unit (PDU) field, a Media Access Control (MAC) address field, and a data field.

Example 52

The method of any one of Examples 43-51, wherein the transmitted data packets comprise a data field that includes a prefix, a proximity Universal Unique Identifier (UUID), a major field, a minor field, and a transmission power field containing the signal strength; and wherein the reference value is a Received Signal Strength Indication (RSSI).

Example 53

The method of any one of Examples 43-52, wherein the transmitter is mounted to the manufacturing apparatus.

It should be noted that the singular forms "a", "an", "the", and the like as used in the description and/or the claims include the plural forms unless expressly discussed otherwise. For example, if the specification and/or claims refer to "a device" or "the device", it includes one or more of such devices.

It should be noted that directional terms, such as "up", "down", "top" "bottom", "fore", "aft", "lateral", "longitudinal", "radial", "circumferential", etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

Glossary of Definitions and Alternatives

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's and Random House dictionaries. As used in the specification and claims, the following definitions apply to the following terms or common variations thereof (e.g., singular/plural forms, past/present tenses, etc.):

"Antenna" or "Antenna system" generally refers to an electrical device, or series of devices, in any suitable configuration, that converts electric power into electromagnetic radiation. Such radiation may be either vertically, horizontally, or circularly polarized at any frequency along the electromagnetic spectrum. Antennas transmitting with circular polarity may have either right-handed or left-handed polarization.

In the case of radio waves, an antenna may transmit at frequencies ranging along electromagnetic spectrum from extremely low frequency (ELF) to extremely high frequency (EHF). An antenna or antenna system designed to transmit radio waves may comprise an arrangement of metallic conductors (elements), electrically connected (often through a transmission line) to a receiver or transmitter. An oscillating current of electrons forced through the antenna by a transmitter can create an oscillating magnetic field around the antenna elements, while the charge of the electrons also creates an oscillating electric field along the elements. These time-varying fields radiate away from the antenna into space as a moving transverse electromagnetic field wave. Conversely, during reception, the oscillating electric and magnetic fields of an incoming electromagnetic wave exert force on the electrons in the antenna elements, causing them to move back and forth, creating oscillating currents in the antenna. These currents can then be detected by receivers and processed to retrieve digital or analog signals or data.

Antennas can be designed to transmit and receive radio waves substantially equally in all horizontal directions (omnidirectional antennas), or preferentially in a particular direction (directional or high gain antennas). In the latter case, an antenna may also include additional elements or surfaces which may or may not have any physical electrical connection to the transmitter or receiver. For example, parasitic elements, parabolic reflectors or horns, and other such non-energized elements serve to direct the radio waves into a beam or other desired radiation pattern. Thus antennas may be configured to exhibit increased or decreased directionality or "gain" by the placement of these various surfaces or elements. High gain antennas can be configured to direct a substantially large portion of the radiated electromagnetic energy in a given direction that may be vertical horizontal or any combination thereof.

Antennas may also be configured to radiate electromagnetic energy within a specific range of vertical angles (i.e. "takeoff angles) relative to the earth in order to focus electromagnetic energy toward an upper layer of the atmosphere such as the ionosphere. By directing electromagnetic energy toward the upper atmosphere at a specific angle, specific skip distances may be achieved at particular times of day by transmitting electromagnetic energy at particular frequencies.

Other examples of antennas include emitters and sensors that convert electrical energy into pulses of electromagnetic energy in the visible or invisible light portion of the electromagnetic spectrum. Examples include light emitting diodes, lasers, and the like that are configured to generate electromagnetic energy at frequencies ranging along the electromagnetic spectrum from far infrared to extreme ultraviolet.

"Beacon" or "beacon transmitter" generally refers to a system or apparatus configured to transmit data using electromagnetic energy. The broadcasted data may include any suitable data such as a string of alphanumeric characters uniquely identifying one beacon from others in the environment. Data may appear in a single field in a datagram, or in multiple separate fields. Any suitable protocol may be used to create and transmit the datagrams using any suitable arrangement of fields. The fields may include predetermined numbers of bits according to proprietary or commercially available protocols. One example of a commercially available protocol is the Bluetooth® LE (Low Energy) protocol, also referred to as Bluetooth® Smart protocol.

Datagrams may include one or more fields that may include a preamble, one or more header fields, an access address field, a Cyclical Redundancy Check (CRC) field, a Protocol Data Unit (PDU) field, a Media Access Control (MAC) address field, and a data field. The data field may include a prefix and a proximity Universal Unique Identifier (UUID) which may be configured to distinguish beacons used by one organization from those of another organization. Other data fields may include a major field which may be used to identify multiple beacons as a group, a minor field which may uniquely identify a specific beacon within a group, and a transmission power field which may indicate how far a beacon is from a receiver. The transmitter power field may include one of a set of data values representing distance ranges such as "immediate", "far", or "out of range". A transmission power field may also include more detailed ranging data such as the Received Signal Strength Indication (RSSI) of the beacon at a predetermined range such as 1 meter away. This value may be compared to a current RSSI measured by a receiver and used to calculate an approximate range.

A beacon may include a receiver allowing the beacon to begin broadcasting after receiving a signal from another transmitter. In one example, a beacon may collect energy from the electromagnetic energy directed toward it and may use this energy to transmit its data in response. This type of "passive" beacon may only transmit when energized to do so by some other transmitter. In another example, beacons may have a local power source such as a battery and may transmit continuously and/or at predetermined intervals. In either case, the data sent by the beacon may pass through walls or other objects between the beacon and a receiver making it unnecessary to maintain an unobstructed line of sight between the two.

A beacon may transmit on any suitable frequency or group of frequencies in the electromagnetic spectrum. For example, a beacon may transmit in the Very High Frequency range (VHF), the Ultra High Frequency range (UHF), or in the Super High Frequency range (SHF). Transmissions from a beacon may be directed along a narrow beam by a directional antenna system used by the beacon, or the beacon may use an omnidirectional antenna system configured to broadcast the data in all directions at about the same time.

The data may be programmed in a memory such as a nonvolatile memory in the beacon for repeated transmission at predetermined intervals. For example, transmissions may be repeated up to about every 500 ms, up to about every 2 seconds, up to about every 30 seconds, or at intervals greater than 30 seconds apart. Beacons may transmit at a very low Transmitter Power Output (TPO) and/or Effective Radiated Power (ERP). TPO or ERP may be less than about 100 milliwatts, less than about 10 milliwatts, or less than about 1 milliwatt.

Examples of commercially available suitable beacon transmitters include beacons available from Estimote, Inc. of New York, N.Y., USA, or from Gimbal, Inc., of San Diego, Calif., USA.

"Computer" generally refers to any computing device configured to compute a result from any number of input values or variables. A computer may include a processor for performing calculations to process input or output. A computer may include a memory for storing values to be processed by the processor, or for storing the results of previous processing.

A computer may also be configured to accept input and output from a wide array of input and output devices for receiving or sending values. Such devices include other computers, keyboards, mice, visual displays, printers, industrial equipment, and systems or machinery of all types and sizes. For example, a computer can control a network or network interface to perform various network communications upon request. The network interface may be part of the computer, or characterized as separate and remote from the computer.

A computer may be a single, physical, computing device such as a desktop computer, a laptop computer, or may be composed of multiple devices of the same type such as a group of servers operating as one device in a networked cluster, or a heterogeneous combination of different computing devices operating as one computer and linked together by a communication network. The communication network connected to the computer may also be connected to a wider network such as the internet. Thus a computer may include one or more physical processors or other computing devices or circuitry, and may also include any suitable type of memory.

A computer may also be a virtual computing platform having an unknown or fluctuating number of physical processors and memories or memory devices. A computer may thus be physically located in one geographical location or physically spread across several widely scattered locations with multiple processors linked together by a communication network to operate as a single computer.

The concept of "computer" and "processor" within a computer or computing device also encompasses any such processor or computing device serving to make calculations or comparisons as part of the disclosed system. Processing operations related to threshold comparisons, rules comparisons, calculations, and the like occurring in a computer may occur, for example, on separate servers, the same server with separate processors, or on a virtual computing environment having an unknown number of physical processors as described above.

A computer may be optionally coupled to one or more visual displays and/or may include an integrated visual display. Likewise, displays may be of the same type, or a heterogeneous combination of different visual devices. A computer may also include one or more operator input devices such as a keyboard, mouse, touch screen, laser or infrared pointing device, or gyroscopic pointing device to name just a few representative examples. Also, besides a display, one or more other output devices may be included such as a printer, plotter, industrial manufacturing machine, 3D printer, and the like. As such, various display, input and output device arrangements are possible.

Multiple computers or computing devices may be configured to communicate with one another or with other devices over wired or wireless communication links to form a network. Network communications may pass through various computers operating as network appliances such as switches, routers, firewalls or other network devices or interfaces before passing over other larger computer networks such as the internet. Communications can also be passed over the network as wireless data transmissions carried over electromagnetic waves through transmission lines or free space. Such communications include using WiFi or other Wireless Local Area Network (WLAN) or a cellular transmitter/receiver to transfer data.

"Data" generally refers to one or more values of qualitative or quantitative variables that are usually the result of measurements. Data may be considered "atomic" as being finite individual units of specific information. Data can also be thought of as a value or set of values that includes a frame of reference indicating some meaning associated with the values. For example, the number "2" alone is a symbol that absent some context is meaningless. The number "2" may be considered "data" when it is understood to indicate, for example, the number of items produced in an hour.

Data may be organized and represented in a structured format. Examples include a tabular representation using rows and columns, a tree representation with a set of nodes considered to have a parent-children relationship, or a graph representation as a set of connected nodes to name a few.

The term "data" can refer to unprocessed data or "raw data" such as a collection of numbers, characters, or other symbols representing individual facts or opinions. Data may be collected by sensors in controlled or uncontrolled environments, or generated by observation, recording, or by processing of other data. The word "data" may be used in a plural or singular form. The older plural form "datum" may be used as well.

"Database" also referred to as a "data store", "data repository", or "knowledge base" generally refers to an organized collection of data. The data is typically organized to model aspects of the real world in a way that supports processes obtaining information about the world from the data. Access to the data is generally provided by a "Database Management System" (DBMS) consisting of an individual computer software program or organized set of software programs that allow user to interact with one or more databases providing access to data stored in the database (although user access restrictions may be put in place to limit access to some portion of the data). The DBMS provides various functions that allow entry, storage and retrieval of large quantities of information as well as ways to manage how that information is organized. A database is not generally portable across different DBMSs, but different DBMSs can interoperate by using standardized protocols and languages such as Structured Query Language (SQL), Open Database Connectivity (ODBC), Java Database Connectivity (JDBC), or Extensible Markup Language (XML) to allow a single application to work with more than one DBMS.

Databases and their corresponding database management systems are often classified according to a particular database model they support. Examples include a DBMS that relies on the "relational model" for storing data, usually referred to as Relational Database Management Systems (RDBMS). Such systems commonly use some variation of SQL to perform functions which include querying, formatting, administering, and updating an RDBMS. Other examples of database models include the "object" model, the "object-relational" model, the "file", "indexed file" or "flat-file" models, the "hierarchical" model, the "network" model, the "document" model, the "XML" model using some variation of XML, the "entity-attribute-value" model, and others.

Examples of commercially available database management systems include PostgreSQL provided by the PostgreSQL Global Development Group; Microsoft SQL Server provided by the Microsoft Corporation of Redmond, Wash., USA; MySQL and various versions of the Oracle DBMS, often referred to as simply "Oracle" both separately offered by the Oracle Corporation of Redwood City, Calif., USA; the DBMS generally referred to as "SAP" provided by SAP SE of Walldorf, Germany; and the DB2 DBMS provided by the International Business Machines Corporation (IBM) of Armonk, N.Y., USA.

The database and the DBMS software may also be referred to collectively as a "database". Similarly, the term "database" may also collectively refer to the database, the corresponding DBMS software, and a physical computer or collection of computers. Thus the term "database" may refer to the data, software for managing the data, and/or a physical computer that includes some or all of the data and/or the software for managing the data.

"Display device" generally refers to any device capable of being controlled by an electronic circuit or processor to display information in a visual or tactile. A display device may be configured as an input device taking input from a user or other system (e.g. a touch sensitive computer screen), or as an output device generating visual or tactile information, or the display device may configured to operate as both an input or output device at the same time, or at different times.

The output may be two-dimensional, three-dimensional, and/or mechanical displays and includes, but is not limited to, the following display technologies: Cathode ray tube display (CRT), Light-emitting diode display (LED), Electroluminescent display (ELD), Electronic paper, Electrophoretic Ink (E-ink), Plasma display panel (PDP), Liquid crystal display (LCD), High-Performance Addressing display (HPA), Thin-film transistor display (TFT), Organic light-emitting diode display (OLED), Surface-conduction electron-emitter display (SED), Laser TV, Carbon nanotubes, Quantum dot display, Interferometric modulator display (IMOD), Swept-volume display, Varifocal mirror display, Emissive volume display, Laser display, Holographic display, Light field displays, Volumetric display, Ticker tape, Split-flap display, Flip-disc display (or flip-dot display), Rollsign, mechanical gauges with moving needles and accompanying indicia, Tactile electronic displays (aka refreshable Braille display), Optacon displays, or any devices that either alone or in combination are configured to provide visual feedback on the status of a system, such as the "check engine" light, a "low altitude" warning light, an array of red, yellow, and green indicators configured to indicate a temperature range.

"Electromagnetic Radiation" generally refers to energy radiated by electromagnetic waves. Electromagnetic radiation is produced from other types of energy, and is converted to other types when it is destroyed. Electromagnetic radiation carries this energy as it travels moving away from its source at the speed of light (in a vacuum). Electromagnetic radiation also carries both momentum and angular momentum. These properties may all be imparted to matter with which the electromagnetic radiation interacts as it moves outwardly away from its source.

Electromagnetic radiation changes speed as it passes from one medium to another. When transitioning from one media to the next, the physical properties of the new medium can cause some or all of the radiated energy to be reflected while the remaining energy passes into the new medium. This occurs at every junction between media that electromagnetic radiation encounters as it travels.

The photon is the quantum of the electromagnetic interaction, and is the basic constituent of all forms of electromagnetic radiation. The quantum nature of light becomes more apparent at high frequencies as electromagnetic radiation behaves more like particles and less like waves as its frequency increases.

"Electromagnetic Spectrum" generally refers to the range of all possible frequencies of electromagnetic radiation. The electromagnetic spectrum is generally categorized as follows, in order of increasing frequency and energy and decreasing wavelength:

"Extremely low frequency" (ELF) generally designates a band of frequencies from about 3 to about 30 Hz with wavelengths from about 100,000 to 10,000 km long.

"Super low frequency" (SLF) generally designates a band of frequencies generally ranging between about 30 Hz to about 300 Hz with wavelengths of about 10,000 to about 1000 km long.

"Voice frequency" or "voice band" generally designates electromagnetic energy that is audibles to the human ear. Adult males generally speak in the range between about 85 and about 180 Hz while adult females generally converse in the range from about 165 to about 255 Hz.

"Very low frequency" (VLF) generally designates the band of frequencies from about 3 kHz to about 30 kHz with corresponding wavelengths from about 10 to about 100 km long.

"Low-frequency" (LF) generally designates the band of frequencies in the range of about 30 kHz to about 300 kHz with wavelengths range from about 1 to about 10 km.

"Medium frequency" (MF) generally designates the band of frequencies from about 300 kHz to about 3 MHz with wavelengths from about 1000 to about 100 m long.

"High frequency" (HF) generally designates the band of frequencies from about 3 MHz to about 30 MHz having wavelengths from about 100 m to about 10 m long.

"Very high frequency" (VHF) generally designates the band of frequencies from about 30 Hz to about 300 MHz with wavelengths from about 10 m to about 1 m long.

"Ultra high frequency" (UHF) generally designates the band of frequencies from about 300 MHz to about 3 GHz with weight wavelengths ranging from about 1 m to about 10 cm long.

"Super high frequency" (SHF) generally designates the band of frequencies from about 3 GHz to about 30 GHz with wavelengths ranging from about 10 cm to about 1 cm long.

"Extremely high frequency" (EHF) generally designates the band of frequencies from about 30 GHz to about 300 GHz with wavelengths ranging from about 1 cm to about 1 mm long.

"Far infrared" (FIR) generally designates a band of frequencies from about 300 GHz to about 20 THz with wavelengths ranging from about 1 mm to about 15 µm long.

"Long-wavelength infrared" (LWIR) generally designates a band of frequencies from about 20 THz to about 37 THz with wavelengths ranging from about 15 µm to about 8 µm long.

"Mid infrared" (MIR) generally designates a band of frequencies from about 37 THz to about 100 THz with wavelengths from about 8 µm to about 3 µm long.

"Short wavelength infrared" (SWIR) generally designates a band of frequencies from about 100 THz to about 214 THz with wavelengths from about 3 µm to about 1.4 µm long "Near-infrared" (NIR) generally designates a band of frequencies from about 214 THz to about 400 THz with wavelengths from about 1.4 µm to about 750 nm long.

"Visible light" generally designates a band of frequencies from about 400 THz to about 750 THz with wavelengths from about 750 nm to about 400 nm long.

"Near ultraviolet" (NUV) generally designates a band of frequencies from about 750 THz to about 1 PHz with wavelengths from about 400 nm to about 300 nm long.

"Middle ultraviolet" (MUV) generally designates a band of frequencies from about 1 PHz to about 1.5 PHz with wavelengths from about 300 nm to about 200 nm long.

"Far ultraviolet" (FUV) generally designates a band of frequencies from about 1.5 PHz to about 2.48 PHz with wavelengths from about 200 nm to about 122 nm long.

"Extreme ultraviolet" (EUV) generally designates a band of frequencies from about 2.48 PHz to about 30 PHz with wavelengths from about 121 nm to about 10 nm long.

"Soft x-rays" (SX) generally designates a band of frequencies from about 30 PHz to about 3 EHz with wavelengths from about 10 nm to about 100 pm long.

"Hard x-rays" (HX) generally designates a band of frequencies from about 3 EHz to about 30 EHz with wavelengths from about 100 pm to about 10 pm long.

"Gamma rays" generally designates a band of frequencies above about 30 EHz with wavelengths less than about 10 pm long.

"Electromagnetic Waves" generally refers to waves having a separate electrical and a magnetic component. The electrical and magnetic components of an electromagnetic wave oscillate in phase and are always separated by a 90 degree angle. Electromagnetic waves can radiate from a source to create electromagnetic radiation capable of passing through a medium or through a vacuum. Electromagnetic waves include waves oscillating at any frequency in the electromagnetic spectrum including, but not limited to, radio waves, visible and invisible light, X-rays, and gamma-rays.

"Input Device" generally refers to any device coupled to a computer that is configured to receive input and deliver the input to a processor, memory, or other part of the computer. Such input devices can include keyboards, mice, trackballs, touch sensitive pointing devices such as touchpads, or touchscreens. Input devices also include any sensor or sensor array for detecting environmental conditions such as temperature, light, noise, vibration, humidity, and the like.

"Memory" generally refers to any storage system or device configured to retain data or information. Each memory may include one or more types of solid-state electronic memory, magnetic memory, or optical memory, just to name a few. Memory may use any suitable storage technology, or combination of storage technologies, and may be volatile, nonvolatile, or a hybrid combination of volatile and nonvolatile varieties. By way of non-limiting example, each memory may include solid-state electronic Random Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM).

Memory can refer to Dynamic Random Access Memory (DRAM) or any variants, including static random access memory (SRAM), Burst SRAM or Synch Burst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (REDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM).

Memory can also refer to non-volatile storage technologies such as non-volatile read access memory (NVRAM), flash memory, non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Domain Wall Memory (DWM) or "Racetrack" memory, Nano-RAM (NRAM), or Millipede memory. Other non-volatile types of memory include optical disc memory (such as a DVD or CD ROM), a magnetically encoded hard disc or hard disc platter, floppy disc, tape, or cartridge media. The concept of a "memory" includes the use of any suitable storage technology or any combination of storage technologies.

"Module" or "Engine" generally refers to a collection of computational or logic circuits implemented in hardware, or to a series of logic or computational instructions expressed in executable, object, or source code, or any combination thereof, configured to perform tasks or implement processes. A module may be implemented in software maintained in volatile memory in a computer and executed by a processor or other circuit. A module may be implemented as software stored in an erasable/programmable nonvolatile memory and executed by a processor or processors. A module may be implanted as software coded into an Application Specific Information Integrated Circuit (ASIC). A module may be a collection of digital or analog circuits configured to control a machine to generate a desired outcome.

Modules may be executed on a single computer with one or more processors, or by multiple computers with multiple processors coupled together by a network. Separate aspects, computations, or functionality performed by a module may be executed by separate processors on separate computers, by the same processor on the same computer, or by different computers at different times.

"Multiple" as used herein is synonymous with the term "plurality" and refers to more than one, or by extension, two or more.

"Network" or "Computer Network" generally refers to a telecommunications network that allows computers to exchange data. Computers can pass data to each other along data connections by transforming data into a collection of datagrams or packets. The connections between computers and the network may be established using either cables, optical fibers, or via electromagnetic transmissions such as for wireless network devices.

Computers coupled to a network may be referred to as "nodes" or as "hosts" and may originate, broadcast, route, or accept data from the network. Nodes can include any computing device such as personal computers, phones, servers as well as specialized computers that operate to maintain the flow of data across the network, referred to as "network devices". Two nodes can be considered "networked together" when one device is able to exchange information with another device, whether or not they have a direct connection to each other.

Examples of wired network connections may include Digital Subscriber Lines (DSL), coaxial cable lines, or optical fiber lines. The wireless connections may include BLUETOOTH, Worldwide Interoperability for Microwave Access (WiMAX), infrared channel or satellite band, or any wireless local area network (Wi-Fi) such as those implemented using the Institute of Electrical and Electronics Engineers' (IEEE) 802.11 standards (e.g. 802.11(a), 802.11 (b), 802.11(g), or 802.11(n) to name a few). Wireless links may also include or use any cellular network standards used to communicate among mobile devices including 1G, 2G, 3G, or 4G. The network standards may qualify as 1G, 2G, etc. by fulfilling a specification or standards such as the specifications maintained by International Telecommunication Union (ITU). For example, a network may be referred to as a "3G network" if it meets the criteria in the International Mobile Telecommunications-2000 (IMT-2000) specification regardless of what it may otherwise be referred to. A network may be referred to as a "4G network" if it meets the requirements of the International Mobile Telecommunications Advanced (IMTAdvanced) specification. Examples of cellular network or other wireless standards include AMPS, GSM, GPRS, UMTS, LTE, LTE Advanced, Mobile WiMAX, and WiMAX-Advanced.

Cellular network standards may use various channel access methods such as FDMA, TDMA, CDMA, or SDMA. Different types of data may be transmitted via different links and standards, or the same types of data may be transmitted via different links and standards.

The geographical scope of the network may vary widely. Examples include a body area network (BAN), a personal area network (PAN), a local-area network (LAN), a metropolitan area network (MAN), a wide area network (WAN), or the Internet.

A network may have any suitable network topology defining the number and use of the network connections. The network topology may be of any suitable form and may include point-to-point, bus, star, ring, mesh, or tree. A network may be an overlay network which is virtual and is configured as one or more layers that use or "lay on top of" other networks.

A network may utilize different communication protocols or messaging techniques including layers or stacks of protocols. Examples include the Ethernet protocol, the internet protocol suite (TCP/IP), the ATM (Asynchronous Transfer Mode) technique, the SONET (Synchronous Optical Networking) protocol, or the SDE1 (Synchronous Digital Elierarchy) protocol. The TCP/IP internet protocol suite may include application layer, transport layer, internet layer (including, e.g., IPv6), or the link layer.

"Output Device" generally refers to any device or collection of devices that is controlled by computer to produce an output. This includes any system, apparatus, or equipment receiving signals from a computer to control the device to generate or create some type of output. Examples of output devices include, but are not limited to, screens or monitors displaying graphical output, any projector a projecting device projecting a two-dimensional or three-dimensional image, any kind of printer, plotter, or similar device producing either two-dimensional or three-dimensional representations of the output fixed in any tangible medium (e.g. a laser printer printing on paper, a lathe controlled to machine a piece of metal, or a three-dimensional printer producing an object). An output device may also produce intangible output such as, for example, data stored in a database, or electromagnetic energy transmitted through a medium or through free space such as audio produced by a speaker controlled by the computer, radio signals transmitted through free space, or pulses of light passing through a fiber-optic cable.

"Personal computing device" generally refers to a computing device configured for use by individual people. Examples include mobile devices such as Personal Digital Assistants (PDAs), tablet computers, wearable computers installed in items worn on the human body such as in eye glasses, laptop computers, portable music/video players, computers in automobiles, or cellular telephones such as smart phones. Personal computing devices can be devices that are typically not mobile such as desk top computers, game consoles, or server computers. Personal computing devices may include any suitable input/output devices and may be configured to access a network such as through a wireless or wired connection, and/or via other network hardware.

"Processor" generally refers to one or more electronic components configured to operate as a single unit configured or programmed to process input to generate an output. Alternatively, when of a multi-component form, a processor may have one or more components located remotely relative to the others. One or more components of each processor may be of the electronic variety defining digital circuitry, analog circuitry, or both. In one example, each processor is of a conventional, integrated circuit microprocessor arrangement, such as one or more PENTIUM, i3, i5 or i7 processors supplied by INTEL Corporation of Santa Clara, Calif., USA. Other examples of commercially available processors include but are not limited to the X8 and Freescale Coldfire processors made by Motorola Corporation of Schaumburg, Ill., USA; the ARM processor and TEGRA System on a Chip (SoC) processors manufactured by Nvidia of Santa Clara, Calif., USA; the POWER7 processor manufactured by International Business Machines of White Plains, N.Y., USA; any of the FX, Phenom, Athlon, Sempron, or Opteron processors manufactured by Advanced Micro Devices of Sunnyvale, Calif., USA; or the Snapdragon SoC processors manufactured by Qalcomm of San Diego, Calif., USA.

A processor also includes Application-Specific Integrated Circuit (ASIC). An ASIC is an Integrated Circuit (IC) customized to perform a specific series of logical operations is controlling a computer to perform specific tasks or functions. An ASIC is an example of a processor for a special purpose computer, rather than a processor configured for general-purpose use. An application-specific integrated circuit generally is not reprogrammable to perform other functions and may be programmed once when it is manufactured.

In another example, a processor may be of the "field programmable" type. Such processors may be programmed multiple times "in the field" to perform various specialized or general functions after they are manufactured. A field-programmable processor may include a Field-Programmable Gate Array (FPGA) in an integrated circuit in the processor. FPGA may be programmed to perform a specific series of instructions which may be retained in nonvolatile memory cells in the FPGA. The FPGA may be configured by a customer or a designer using a hardware description language (HDL). In FPGA may be reprogrammed using another computer to reconfigure the FPGA to implement a new set of commands or operating instructions. Such an operation may be executed in any suitable means such as by a firmware upgrade to the processor circuitry.

Just as the concept of a computer is not limited to a single physical device in a single location, so also the concept of a "processor" is not limited to a single physical logic circuit or package of circuits but includes one or more such circuits or circuit packages possibly contained within or across multiple computers in numerous physical locations. In a virtual computing environment, an unknown number of physical processors may be actively processing data, the unknown number may automatically change over time as well.

The concept of a "processor" includes a device configured or programmed to make threshold comparisons, rules comparisons, calculations, or perform logical operations applying a rule to data yielding a logical result (e.g. "true" or "false"). Processing activities may occur in multiple single processors on separate servers, on multiple processors in a single server with separate processors, or on multiple processors physically remote from one another in separate computing devices.

"Receiver" generally refers to a device configured to receive, for example, digital or analog signals carrying information via electromagnetic energy. A receiver using electromagnetic energy may operate with an antenna or antenna system to intercept electromagnetic waves passing through a medium such as air, a conductor such as a metallic cable, or through glass fibers. A receiver can be a separate piece of electronic equipment, or an electrical circuit within another electronic device. A receiver and a transmitter combined in one unit are called a "transceiver".

A receiver may use electronic circuits configured to filter or separate one or more desired radio frequency signals from all the other signals received by the antenna, an electronic amplifier to increase the power of the signal for further processing, and circuits configured to demodulate the information received.

Examples of the information received include sound (an audio signal), images (a video signal) or data (a digital signal). Devices that contain radio receivers include television sets, radar equipment, two-way radios, cell phones and other cellular devices, wireless computer networks, GPS navigation devices, radio telescopes, Bluetooth enabled devices, garage door openers, "Rule" generally refers to a conditional statement with at least two outcomes. A rule may be compared to available data which can yield a positive result (all aspects of the conditional statement of the rule are satisfied by the data), or a negative result (at least one aspect of the conditional statement of the rule is not satisfied by the data). One example of a rule is shown below as pseudo code of an "if/then/else" statement that may be coded in a programming language and executed by a processor in a computer:

```
if(clouds.areGrey( ) and
(clouds.numberOfClouds > 100)) then {
    prepare for rain;
} else {
    Prepare for sunshine;
}
```

"Transmit" generally refers to causing something to be transferred, communicated, conveyed, relayed, dispatched, or forwarded. The concept may or may not include the act of conveying something from a transmitting entity to a receiving entity. For example, a transmission may be received without knowledge as to who or what transmitted it. Likewise the transmission may be sent with or without knowledge of who or what is receiving it. To "transmit" may include, but is not limited to, the act of sending or broadcasting electromagnetic energy at any suitable frequency in the electromagnetic spectrum. Transmissions may include digital signals which may define various types of binary data such as datagrams, packets and the like. A transmission may also include analog signals.

"Triggering a Rule" generally refers to an outcome that follows when all elements of a conditional statement expressed in a rule are satisfied. In this context, a conditional statement may result in either a positive result (all conditions of the rule are satisfied by the data), or a negative result (at least one of the conditions of the rule is not satisfied by the data) when compared to available data. The conditions expressed in the rule are triggered if all conditions are met causing program execution to proceed along a different path than if the rule is not triggered.

What is claimed is:
1. A system, comprising:
a wireless transmitter adjacent to an object in a production environment, the transmitter configured to automatically transmit data defining a reference value which represents a known signal strength of the transmitter measured at a predefined fixed distance;
a portable computer having a display device and a wireless receiver responsive to the wireless transmitter adjacent the object;
wherein the portable computer is configured to automatically:
receive the reference value from the wireless transmitter;
measure the current received strength of signals currently sent by the transmitter and received by the wireless receiver;
compute a distance between the transmitter and the portable computer by comparing the known signal strength of the reference value and the received signal strength;
present a user interface using the display device that includes a first set of information about the object when the distance between the portable computer and transmitter is greater than a predetermined threshold, and a second set of information about the object when the distance between the portable computer and the transmitter is less than the predetermined threshold, the transmitter thus automatically controlling the portable computer based on the distance between the portable computer and the transmitter;

display a map display in the user interface, the map display having a first and a separate second indicator corresponding to the object, the user interface displaying the first indicator when the distance between the portable computer and transmitter is greater than a predetermined threshold, and the second indicator when the distance between the portable computer and the transmitter is less than the predetermined threshold; and accept user input selecting the first or second indicators on the map display, wherein the user interface is configured to display the first set of information about the object when the user input selects the first indicator and the distance between the portable computer and transmitter is greater than a predetermined threshold, and to display the second set of information about the object when the user selects the second indicator when the distance between the portable computer and the transmitter is less than the predetermined threshold.

2. The system of claim 1, comprising:
multiple other wireless transmitters associated with multiple other objects, the multiple other transmitters configured to automatically transmit corresponding multiple other reference values representing a known signal strength for each transmitter measured at a predefined fixed distance;
wherein the portable computer is configured to operate in a scanning mode that includes:
receiving the multiple other reference values from the multiple other wireless transmitters;
computing multiple separate distances between the multiple other transmitters and the portable computer using the reference values and received signal strengths from each of the multiple other wireless transmitters; and
displaying first and second different object indicators on the map user interface using the display device, the user interface displaying the first indicator for each of the multiple transmitters that is greater than a predetermined threshold distance from the receiver, and the user interface displaying the second indicator for each of the multiple transmitters that is less than a predetermined threshold distance from the receiver.

3. The system of claim 2, wherein one of the multiple transmitters is an
employee transmitter associated with an employee; and
wherein the portable computer is configured to automatically change the user interface to display employee information when the portable computer is within the predetermined threshold distance from the employee transmitter.

4. The system of claim 2, wherein one of the multiple transmitters is a
product transmitter associated with a product produced in the production environment; and
wherein the portable computer is configured to automatically change the user interface to display product information when the portable computer is within the predetermined threshold distance from the product transmitter.

5. The system of claim 2, wherein the user interface is configured to accept input deactivating the scanning mode, and wherein the user interface retains the corresponding first or second indicators for each of the multiple transmitters when the scanning mode is deactivated.

6. The system of claim 1, wherein the portable computer is configured to accept input defining the user as a worker, and wherein the user interface includes information about the object specifically for workers and not for others.

7. The system of claim 1, wherein the portable computer is configured to accept input defining the user as a supervisor, and wherein the user interface includes information about the object specifically for supervisors and not for others.

8. The system of claim 1, comprising:
a server in communication with the object via a computer network, the server having a database that includes the information about the object;
wherein the portable computer is in communication with the server via the computer network;
wherein the data sent by the transmitter includes an identifier for identifying the object;
wherein the portable computer is configured to automatically receive the identifier and to use the identifier to retrieve the information about the object.

9. The system of claim 8,
wherein the information about the object includes operating parameter values for the object;
wherein the user interface is configured to display the current operating parameter values;
wherein the portable computer is configured to:
accept input changing the value of at least one operating parameter from the present value to a new value; and
communicate the new value of the at least one operating parameter to the server; and
wherein the object is configured to retrieve the new value of the operating parameter from the server and to adjust its operation accordingly.

10. The system of claim 9, wherein the database includes tracking information associating users of the portable computer with requests for operating parameters made when the computer is within the predetermined threshold distance from the transmitter; and
wherein the portable computer is configured change the tracking information associated with the transmitter to include user identifying information for a given user of the portable computer and a timestamp indicating when the portable computer requested the one or more parameter values associated with the transmitter.

11. The system of claim 1, wherein the transmitted data includes data packets having a preamble, one or more header fields, an access address field, a Cyclical Redundancy Check (CRC) field, a Protocol Data Unit (PDU) field, a Media Access Control (MAC) address field, and a data field.

12. The system of claim 1, wherein the object is an apparatus used in the production of products in the production environment, and wherein the transmitter is mounted to the apparatus.

13. The system of claim 1, wherein the object is a piece of mobile equipment used in the production environment, and wherein the transmitter is mounted to the piece of equipment.

\* \* \* \* \*